(12) United States Patent
Claessen et al.

(10) Patent No.: US 11,494,957 B2
(45) Date of Patent: Nov. 8, 2022

(54) AUTOMATED CORRECTION OF METAL AFFECTED VOXEL REPRESENTATIONS OF X-RAY DATA USING DEEP LEARNING TECHNIQUES

(71) Applicant: Promaton Holding B.V., Amsterdam (NL)

(72) Inventors: Frank Theodorus Catharina Claessen, Amsterdam (NL); Sarah Anne Parinussa, Amsterdam (NL); David Anssari Moin, Amsterdam (NL)

(73) Assignee: PROMATON HOLDING B.V., Amsterdam (NL)

( * ) Notice: Subject to any disclaimer, the term of this patent is extended or adjusted under 35 U.S.C. 154(b) by 0 days.

(21) Appl. No.: 17/079,140

(22) Filed: Oct. 23, 2020

(65) Prior Publication Data

US 2021/0110584 A1  Apr. 15, 2021

Related U.S. Application Data

(63) Continuation of application No. PCT/EP2019/060813, filed on Apr. 26, 2019.

(30) Foreign Application Priority Data

Apr. 26, 2018 (EP) .................................. 18169651

(51) Int. Cl.
*G06T 11/00* (2006.01)
*G06K 9/62* (2022.01)
(Continued)

(52) U.S. Cl.
CPC .......... *G06T 11/008* (2013.01); *G06K 9/6277* (2013.01); *G06T 7/0012* (2013.01);
(Continued)

(58) Field of Classification Search
CPC ................. G06T 11/008; G06T 7/0012; G06T 2207/10116; G06T 2207/20081;
(Continued)

(56) References Cited

U.S. PATENT DOCUMENTS 6,721,387 B1 * 4/2004 Naidu .................. A61B 6/5258
378/4
8,135,569 B2 3/2012 Matov et al.
(Continued)

FOREIGN PATENT DOCUMENTS

CN  101977564 A  2/2011
CN  106618760 A  5/2017
(Continued)

OTHER PUBLICATIONS

Zhang et al., "CT Artifact Reduction Via U-Net CNN", Proc. SPIE, Medical Imaging 2018: Image Processing, Mar. 2, 2018, 6 pages, vol. 10574. (Year: 2018).*
(Continued)

*Primary Examiner* — Van D Huynh
(74) *Attorney, Agent, or Firm* — Steven M. Koehler; Westman, Champlin & Koehler, P.A.

(57) ABSTRACT

A computer-implemented method for correction of a voxel representation of metal affected x-ray data. The method comprises a first 3D deep neural network receiving an initial voxel representation of x-ray data at its input and generating a voxel map at its output, the map identifying voxels of the initial voxel representation that belong to a region of voxels that are affected by metal. A second 3D deep neural network receives the initial voxel representation and the map generated by the first 3D deep neural network at its input and generating a corrected voxel representation, the corrected voxel representation including voxel estimations for voxels that are identified by the voxel map as being part of a metal
(Continued)

affected region, the first 3D deep neural being trained on the basis of training data and reference data that include voxel representations of clinical x-ray data of a predetermined body part of a patient.

18 Claims, 14 Drawing Sheets

(51) Int. Cl.
*G06T 7/00* (2017.01)
*G06V 20/64* (2022.01)

(52) U.S. Cl.
CPC .... *G06V 20/64* (2022.01); *G06T 2207/10116* (2013.01); *G06T 2207/20081* (2013.01); *G06T 2207/20084* (2013.01); *G06T 2207/30036* (2013.01); *G06T 2207/30052* (2013.01); *G06T 2210/41* (2013.01)

(58) Field of Classification Search
CPC . G06T 2207/20084; G06T 2207/30036; G06T 2207/30052; G06T 2210/41; G06T 2219/2012; G06T 19/20; G06T 15/08; G06K 9/6277; G06V 20/64; G06N 3/0454
USPC .......................................................... 382/131
See application file for complete search history.

(56) References Cited

U.S. PATENT DOCUMENTS

| | | | |
|---|---|---|---|
| 8,439,672 B2 | 5/2013 | Matov et al. | |
| 8,639,477 B2 | 1/2014 | Chelnokov et al. | |
| 9,107,722 B2 | 8/2015 | Matov et al. | |
| 9,135,498 B2 | 9/2015 | Andreiko et al. | |
| 9,904,999 B2 | 2/2018 | Andreiko et al. | |
| 10,032,271 B2 | 7/2018 | Somasundaram et al. | |
| 10,235,606 B2 | 3/2019 | Miao et al. | |
| 10,456,229 B2 | 10/2019 | Fisker et al. | |
| 10,610,185 B2* | 4/2020 | Taguchi | A61B 6/4447 |
| 10,685,259 B2 | 6/2020 | Salah et al. | |
| 10,932,890 B1 | 3/2021 | Sant et al. | |
| 10,997,727 B2 | 5/2021 | Xue et al. | |
| 11,007,036 B2 | 5/2021 | Pokotilov et al. | |
| 11,107,218 B2 | 8/2021 | Salah et al. | |
| 2008/0253635 A1* | 10/2008 | Spies | G06T 11/008 382/131 |
| 2009/0191503 A1 | 7/2009 | Matov et al. | |
| 2010/0069741 A1* | 3/2010 | Kuhn | A61B 5/062 378/62 |
| 2011/0038516 A1* | 2/2011 | Koehler | G06T 7/149 382/128 |
| 2011/0081071 A1* | 4/2011 | Benson | A61B 6/5258 382/154 |
| 2011/0255765 A1 | 10/2011 | Carlson et al. | |
| 2012/0063655 A1 | 3/2012 | Dean et al. | |
| 2013/0022251 A1 | 1/2013 | Chen et al. | |
| 2013/0039556 A1* | 2/2013 | Kachelriess | G06T 5/003 382/131 |
| 2013/0230818 A1 | 9/2013 | Matov et al. | |
| 2014/0169648 A1 | 6/2014 | Andreiko et al. | |
| 2014/0227655 A1 | 8/2014 | Andreiko et al. | |
| 2015/0029178 A1* | 1/2015 | Claus | A61B 6/032 345/419 |
| 2016/0008095 A1 | 1/2016 | Matov et al. | |
| 2016/0034788 A1 | 2/2016 | Lin et al. | |
| 2016/0042509 A1 | 2/2016 | Andreiko et al. | |
| 2016/0078647 A1* | 3/2016 | Schildkraut | G06T 11/005 382/131 |
| 2016/0117850 A1* | 4/2016 | Jin | A61B 6/5258 382/131 |
| 2016/0324499 A1* | 11/2016 | Sen Sharma | A61B 6/5258 |
| 2016/0371862 A1* | 12/2016 | Silver | G06T 7/11 |
| 2017/0024634 A1 | 1/2017 | Miao et al. | |
| 2017/0046616 A1 | 2/2017 | Socher et al. | |
| 2017/0100212 A1 | 4/2017 | Sherwood et al. | |
| 2017/0150937 A1* | 6/2017 | Stille | G06T 11/005 |
| 2017/0169562 A1 | 6/2017 | Somasundaram et al. | |
| 2017/0265977 A1 | 9/2017 | Fisker et al. | |
| 2017/0270687 A1* | 9/2017 | Manhart | G06T 7/11 |
| 2018/0028294 A1 | 2/2018 | Azernikov et al. | |
| 2018/0110590 A1 | 4/2018 | Maraj et al. | |
| 2018/0182098 A1 | 6/2018 | Andreiko et al. | |
| 2018/0300877 A1 | 10/2018 | Somasundaram et al. | |
| 2019/0026599 A1 | 1/2019 | Salah et al. | |
| 2019/0147666 A1 | 5/2019 | Keustermans et al. | |
| 2019/0164288 A1* | 5/2019 | Wang | G06T 5/005 |
| 2019/0172200 A1 | 6/2019 | Andreiko et al. | |
| 2019/0282333 A1 | 9/2019 | Matov et al. | |
| 2019/0328489 A1 | 10/2019 | Capron-Richard et al. | |
| 2020/0015948 A1 | 1/2020 | Fisker et al. | |
| 2020/0022790 A1 | 1/2020 | Fisker | |
| 2020/0085535 A1 | 3/2020 | Pokotilov et al. | |
| 2020/0179089 A1 | 6/2020 | Serval et al. | |
| 2020/0320685 A1 | 10/2020 | Anssari Moin et al. | |
| 2021/0045843 A1 | 2/2021 | Pokotilov et al. | |
| 2021/0082184 A1 | 3/2021 | Claessen et al. | |
| 2021/0150702 A1 | 5/2021 | Claessen et al. | |
| 2021/0174543 A1 | 6/2021 | Claessen et al. | |
| 2021/0217233 A1 | 7/2021 | Feng et al. | |
| 2021/0264611 A1 | 8/2021 | Xue et al. | |
| 2021/0322136 A1 | 10/2021 | Anssari Moin et al. | |

FOREIGN PATENT DOCUMENTS

| | | |
|---|---|---|
| CN | 108205806 A | 6/2018 |
| CN | 108305684 A | 7/2018 |
| EP | 2742857 A1 | 6/2014 |
| EP | 3121789 A1 | 1/2017 |
| EP | 3462373 A1 | 4/2019 |
| EP | 3591616 A1 | 1/2020 |
| EP | 3671521 A1 | 6/2020 |
| EP | 3767531 A1 | 1/2021 |
| JP | 2010-220742 A | 10/2010 |
| JP | 2013-537445 A | 10/2013 |
| JP | 2017-102622 A | 6/2017 |
| JP | 2017-520292 A | 7/2017 |
| JP | 2017-157138 A | 9/2017 |
| WO | 2015169910 A1 | 11/2015 |
| WO | 2017099990 A1 | 6/2017 |
| WO | 2019002631 A1 | 1/2019 |
| WO | 2019068741 A2 | 4/2019 |
| WO | 2019122373 A1 | 6/2019 |
| WO | 2020007941 A1 | 1/2020 |
| WO | 2020048960 A1 | 3/2020 |
| WO | 2020127398 A1 | 6/2020 |
| WO | 2021009258 A1 | 1/2021 |

OTHER PUBLICATIONS

Gjesteby et al., "Deep Learning Methods for CT Image-Domain Metal Artifact Reduction", Proc. SPIE, Developments in X-Ray Tomography XI, Sep. 25, 2017, 6 pages, vol. 10391. (Year: 2017).*

Cçiçek et al., "3D U-Net: Learning Dense Volumetric Segmentation from Sparse Annotation", Medical Image Computing and Computer-Assisted Intervention—MICCAI 2016, Part II, Oct. 2, 2016, pp. 424-432.

Gjesteby et al., "Deep Learning Methods for CT Image-Domain Metal Artifact Reduction", Proc. SPIE, Developments in X-Ray Tomography XI, Sep. 25, 2017, 6 pages, vol. 10391.

Han et al., "Deep Residual Learning for Compressed Sensing CT Reconstruction via Persistent Homology Analysis", Cornell University Library, Nov. 19, 2016, pp. 1-10.

Isola et al., "Image-to-Image Translation with Conditional Adversarial Networks", 2017 IEEE Conference on Computer Vision and Pattern Recognition (CVPR), Honolulu, HI, 2017, pp. 5967-5976.

Meyer et al., "Normalized Metal Artifact Reduction (NMAR) in Computed Tomography", Med. Phys., Oct. 2010, pp. 5482-5493, vol. 37, No. 10.

(56) References Cited

OTHER PUBLICATIONS

Schulze et al., "Artefacts in CBCT: A Review", Dentomaxillofacial Radiology, Jul. 1, 2011, pp. 265-273, vol. 40, No. 5.
Zhang et al., "CT Artifact Reduction Via U-Net CNN", Proc. SPIE, Medical Imaging 2018: Image Processing, Mar. 2, 2018, 6 pages, vol. 10574.
Zhang et al., "Convolutional Neural Network Based Metal Artifact Reduction in X-Ray Computed Tomography", IEEE Transactions on Medical Imaging, Jun. 2018, pp. 1370-1381, vol. 37, No. 6.
International Search Report and Written Opinion dated Jun. 12, 2019 for corresponding International Application No. PCT/EP2019/060813, filed Apr. 26, 2019.
Chen et al. "Deep RBFNet: Point Cloud Feature Learning Using Radial Basis Functions", Cornell University Library, Dec. 11, 2018, 11 pages.
Chen et al. "Fast Resampling of 3D Point Clouds Via Graphs", IEEE Transactions on Signal Processing, Feb. 1, 2018, pp. 666-681, vol. 66, No. 3.
Eun, H. and Kim, C. "Oriented Tooth Localization for Periapical Dental X-ray Images via Convolutional Neural Network", Asia-Pacific Signal and Information Processing Association Annual Summit and Conference (APSIPA), Dec. 3, 2016, pp. 1-7.
Fang et al. "3D Deep Shape Descriptor", 2015 IEEE Conference on Computer Vision and Pattern Recognition (CVPR), 2015, pp. 2319-2328.
Ghafoorian et al. "EL-GAN: Embedding Loss Driven Generative Adversarial Networks for Lane Detection", Computer Vision—ECCV 2018 Workshops, Jan. 23, 2019, pp. 256-272, vol. 11129.
Ghazvinian Zanjani et al. "Deep Learning Approach to Semantic Segmentation in 3D Point Cloud Intra-oral Scans of Teeth", Proceedings of the 2nd International Conference on Medical Imaging with Deep Learning, 2019, 22 pages, retrieved online from https://openreview.net/forum?id=ByxLSoblgV.
Gomes et al. "Efficient 3D Object Recognition Using Foveated Point Clouds", Computers & Graphics, May 1, 2013, pp. 496-508, vol. 37.
Gorler, O. and Akkoyun, S. "Artificial Neural Networks Can be Used as Alternative Method to Estimate Loss Tooth Root Sizes for Prediction of Dental Implants", Cumhuriyet University Faculty of Science Science Journal (CSJ), Apr. 2017, pp. 385-395, vol. 38, No. 2.
Guo et al. "3D Mesh Labeling Via Deep Convolutional Neural Networks", ACM Transactions on Graphics, Dec. 2015, pp. 1-12, vol. 35, No. 1, Article 3.
Hermosilla et al. "Monte Carlo Convolution for Learning on Non-Uniformly Shaped Point Clouds", ACM Transactions on Graphics, Nov. 2018, 12 pages, vol. 37, No. 6, Article 235.
Hou et al. "3D-SIS: 3D Semantic Instance Segmentation of RGB-D Scans", Computer Vision and Pattern Recognition (CPR), Apr. 29, 2019, 14 pages.
Huang et al. "Edge-Aware Point Set Resampling", ACM Transactions on Graphics, 2013, pp. 1-12, vol. 32, No. 1, Article 9.
Johari et al. "Detection of Vertical Root Fractures in Intact and Endodontically Treated Premolar Teeth by Designing a Probabilistic Neural Network: An ex vivo Study", Dentomaxillofacial Radiology, Feb. 2017, vol. 46, No. 2, pp. 1-9.
Ku et al. "Joint 3D Proposal Generation and Object Detection from View Aggregation", IEEE/RSJ International Conference on Intelligent Robots and Systems (IROS), Jul. 12, 2018, pp. 1-8.
Le T. and Duan Y. "PointGrid: A Deep Network for 3D Shape Understanding", Proceedings of the IEEE Conference on Computer Vision and Pattern Recognition, Jun. 18-23, 2018, pp. 9204-9214.
Li et al. "SO-Net: Self-Organizing Network for Point Cloud Analysis", Eye In-Painting with Exemplar Generative Adversarial Networks, Jun. 2018, pp. 9397-9406.
Liu, C. and Furukawa, Y. "MASC: Multi-scale Affinity with Sparse Convolution for 3D Instance Segmentation", Computer Vision and Pattern Recognition (CPR), Feb. 12, 2019, 4 pages.

Qi et al. "Frustum PointNets for 3D Object Detection from RGB-D Data", Computer Vision and Pattern Recognition (CPR), Apr. 13, 2018, 15 pages.
Qi et al. "PointNet++: Deep Hierarchical Feature Learning on Point Sets in a Metric Space", Conference on Neural Information Processing Systems (NIPS), Jun. 2017, 14 pages.
Ravanbakhsh et al. "Deep Learning With Sets and Point Clouds", Feb. 24, 2017, 12 pages, retrieved online from https://arxiv.org/abs/1611.04500.
Silva et al. "Automatic Segmenting Teeth in X-Ray Images: Trends, A Novel Data Set, Benchmarking and Future Perspectives", Feb. 9, 2018, 33 pages, retrieved online from https://arxiv.org/pdf/1802.03086.pdf.
Skrodzki et al. "Directional Density Measure to Intrinsically Estimate and Counteract Non-Uniformity in Point Clouds", Computer Aided Geometric Design, Aug. 2018, pp. 73-89, vol. 64.
Shaoqing et al. "Mask R-CNN", Proceedings of the IEEE International Conference on Computer Vision, 2017, pp. 2961-2969.
Tian, S. "Automatic Classification and Segmentation of Teeth on 3D Dental Model Using Hierarchical Deep Learning Networks" IEEE Journals & Magazine, Jun. 21, 2019, p. 84817-84828.
Wang et al. "SGPN: Similarity Group Proposal Network for 3D Point Cloud Instance Segmentation", CVF Conference on Computer Vision and Pattern Recognition, Nov. 23, 2017, 13 pages.
Wu et al. "3D ShapeNets: A Deep Representation for Volumetric Shapes", 2015 IEEE Conference on Computer Vision and Pattern Recognition (CVPR), 2015, pp. 1912-1920.
Xu et al. "SpiderCNN: Deep Learning on Point Sets with Parameterized Convolutional Filters", Computer Vision—EECV, 2018, 16 pages.
Yi et al. "GSPN: Generative Shape Proposal Network for 3D Instance Segmentation in Point Cloud", Proceedings of the IEEE/CVF Conference on Computer Vision and Pattern Recognition (CVPR), 2019, 13 pages.
Zhou et al. "A Method for Tooth Model Reconstruction Based on Integration of Multimodal Images", Journal of Healthcare Engineering, Jun. 20, 2018, vol. 8, pp. 1-8.
Non-published U.S. Appl. No. 17/415,465, filed Jun. 17, 2021.
Non-published U.S. Appl. No. 17/626,744, filed Jan. 12, 2022.
Ahn, B. "The Compact 3D Convolutional Neural Network for Medical Images", Jul. 2, 2017, pp. 1-9, http://cs231n.standord.edu/reports/2017/pdfs/23/pdf, retrieved Dec. 18, 2018.
Auro Tripathy, "Five Insights from GoogLeNet You Could Use in Your Own Deep Learning Nets", Sep. 20, 2016, pp. 1-21, https://www.slideshare.net/aurot/googlenet-insights?from_action-save, retrieved Dec. 18, 2018.
Bustos et al. "An Experimental Comparison of Feature-Based 3D Retrieval Methods" 2nd International Symposium on 3D Data Processing, Visualization, and Transmission, 3DPVT 2004, Sep. 6-9, 2004, pp. 215-222.
Chaouch, M. and Verroust-Blondet, A. "Alignment of 3D Models", Graphical Models, Mar. 2009, pp. 63-76, vol. 71, No. 2.
Duda et al. "Pattern Classification: Introduction", 2001, Pattern Classification, New York, John Wiley & Sons, US, pp. 1-13.
Duy et al. "Automatic Detection and Classification of Teeth in CT Data", International Conference on Medical Image Computing and Computer-Assisted Intervention—MICCAI 2012, 2012, pp. 609-616.
Everingham et al. "The PASCAL Visual Object Classes (VOC) Challenge", International Journal of Computer Vision, Sep. 9, 2009, pp. 303-338, vol. 88, No. 2.
Fechter et al. "A 3D Fully Convolutional Neural Network and a Random Walker to Segment the Esophagus in CT", Apr. 21, 2017, 23 pages, https://arxiv.org/pdf/1704.06544.pdf, retrieved Dec. 18, 2018.
Gkantidis et al. "Evaluation of 3-Dimensional Superimposition Techniques on Various Skeletal Structures of the Head Using Surface Models", PLOS ONE, Feb. 23, 2015, 20 pages, vol. 10, No. 2.
Hall, P. and Owen, M. "Simple Canonical Views", Proceedings of the British Machine Vision Conference (BMVC), Sep. 2005, 10 pages.

(56) References Cited

OTHER PUBLICATIONS

He et al. "Deep Residual Learning for Image Recognition", 2016 IEEE Conference on Computer Vision and Pattern Recognition (CPR), Jun. 2016, pp. 770-778.
Hongming Li, Y. "Non-Rigid Image Registration Using Fully Convolutional Networks With Deep Self-Supervision", Sep. 3, 2017, 8 pages.
Joda, T. and Gallucci, G. "Systematic Literature Review of Digital Three-Dimensional Superimposition Techniques to Create Virtual Dental Patients", The International Journal of Oral & Maxillofacial Implants, 2015, pp. 330-337, vol. 30, No. 2.
Jung et al. "Combining Volumetric Dental CT and Optical Scan Data for Teeth Modeling", Computer-Aided Design, Oct. 2015, pp. 24-37, vol. 67-68.
Klinder et al. "Automated Model-Based Vertebra Detection, Identification, and Segmentation in CT Images", Medical Image Analysis, Jun. 2009, pp. 471-482, vol. 13, No. 3.
Li et al. "PointCNN: Convolution on X-Transformed Points", Neural Information Processing Systems (NIPS), Nov. 5, 2018, 11 pages.
Liao et al. "Automatic Tooth Segmentation of Dental Mesh Based on Harmonic Fields", Biomedical Research International, 2015, 10 pages, vol. 2015.
Litjens et al. "A Survey on Deep Learning in Medical Image Analysis", Medical Image Analysis, Dec. 2017, pp. 60-88, vol. 42.
Miki et al. "Tooth Labeling in Cone-Beam CT Using Deep Convolutional Neural Network for Forensic Identification", SPIE 10134, Medical Imaging 2017: Computer-Aided Diagnosis, Mar. 3, 2017, 6 pages.
Miki et al. "Classification of Teeth in Cone-Beam CT Using Deep Convolutional Neural Network", Computers in Biology and Medicine, Jan. 2017, pp. 24-29, vol. 1, No. 80.
Pavaloiu et al. "Automatic Segmentation for 3D Dental Reconstruction", IEEE 6th ICCCNT, Jul. 13-15, 2015, 6 pages.
Pavaloiu et al. "Neural Network Based Edge Detection for CBCT Segmentation", 5th IEEE EHB, Nov. 19-21, 2015.
Qi et al. "PointNet: Deep Learning on Point Sets for 3D Classification and Segmentation", Computer Vision and Pattern Recognition (CVPR), 2017, 19 pages.
Ruellas et al. "3D Mandibular Superimposition: Comparison of Regions of Reference for Voxel-Based Registration" PLOS ONE, Jun. 23, 2016, 13 pages.
Ryu et al. "Analysis of Skin Movement With Respect to Flexional Bone Motion Using MR Images of a Hand", Journal of Biomechanics, 2006, pp. 844-852, vol. 39, No. 5.
Sekuboyina et al. "A Localisation-Segmentation Approach for Multi-Label Annotation of Lumbar Vertebrae Using Deep Nuts", Cornell University Library, 201 Olin Library Cornell University Ithaca, NY 14853, Mar. 13, 2017, 10 pages.
Simonovsky et al. "A Deep Metric for Multimodal Registration" International Conference on Medical Image Computing and Computer-Assisted Intervention (MICCAI), 2016, pp. 10-18, vol. 9902.
Szegedy et al. "Going Deeper With Convolutions", 2015 IEEE Conference on Computer Vision and Pattern Recognition (CVPR), Jun. 2015, pp. 1-9.
Tonioni et al. "Learning to Detect Good 3D Keypoints", International Journal of Computer Vision, 2018, pp. 1-20, vol. 126.
Wang et al. "Dynamic Graph CNN for Learning on Point Clouds", ACM Trans. Graph, Jan. 2019, vol. 1, No. 1, 13 pages.
Wu et al. "Tooth Segmentation on Dental Meshes Using Morphologic Skeleton", Computers & Graphics, Feb. 2014, pp. 199-211, vol. 38.
Wu et al. "Model-Based Teeth Reconstruction", ACM Transactions on Graphics (TOG), ACM, US, Nov. 11, 2016, pp. 1-13, vol. 35, No. 6.
Yau et al. "Tooth Model Reconstruction Based Upon Data Fusion for Orthodontic Treatment Simulation", Computers in Biology and Medicine, May 1, 2014, pp. 8-16, vol. 48.
Yu, Y. "Machine Learning for Dental Image Analysis", Nov. 2016, 61 pages, https://arxiv.org/ftp/arxiv/papers/1611/1611.09958.pdf, retrieved Nov. 30, 2017.
Gutierrez-Becker et al. "Learning Optimization Updates for Multimodal Registration", Medical Image Computing and Computer-Assisted Intervention—MICCAI 2016, 2016, pp. 19-27.
Hosntalab et al. "A Hybrid Segmentation Framework for Computer-Assisted Dental Procedures", IEICE Transactions on Information and Systems, Oct. 2009, pp. 2137-2151, vol. E92D, No. 10.
Studholme et al. "Automated Three-Dimensional Registration of Magnetic Resonance and Positron Emission Tomography Brain Images by Multiresolution Optimization of Voxel Similarity Measures", Medical Physics, 1997, pp. 25-35, vol. 24. No. 1.

\* cited by examiner

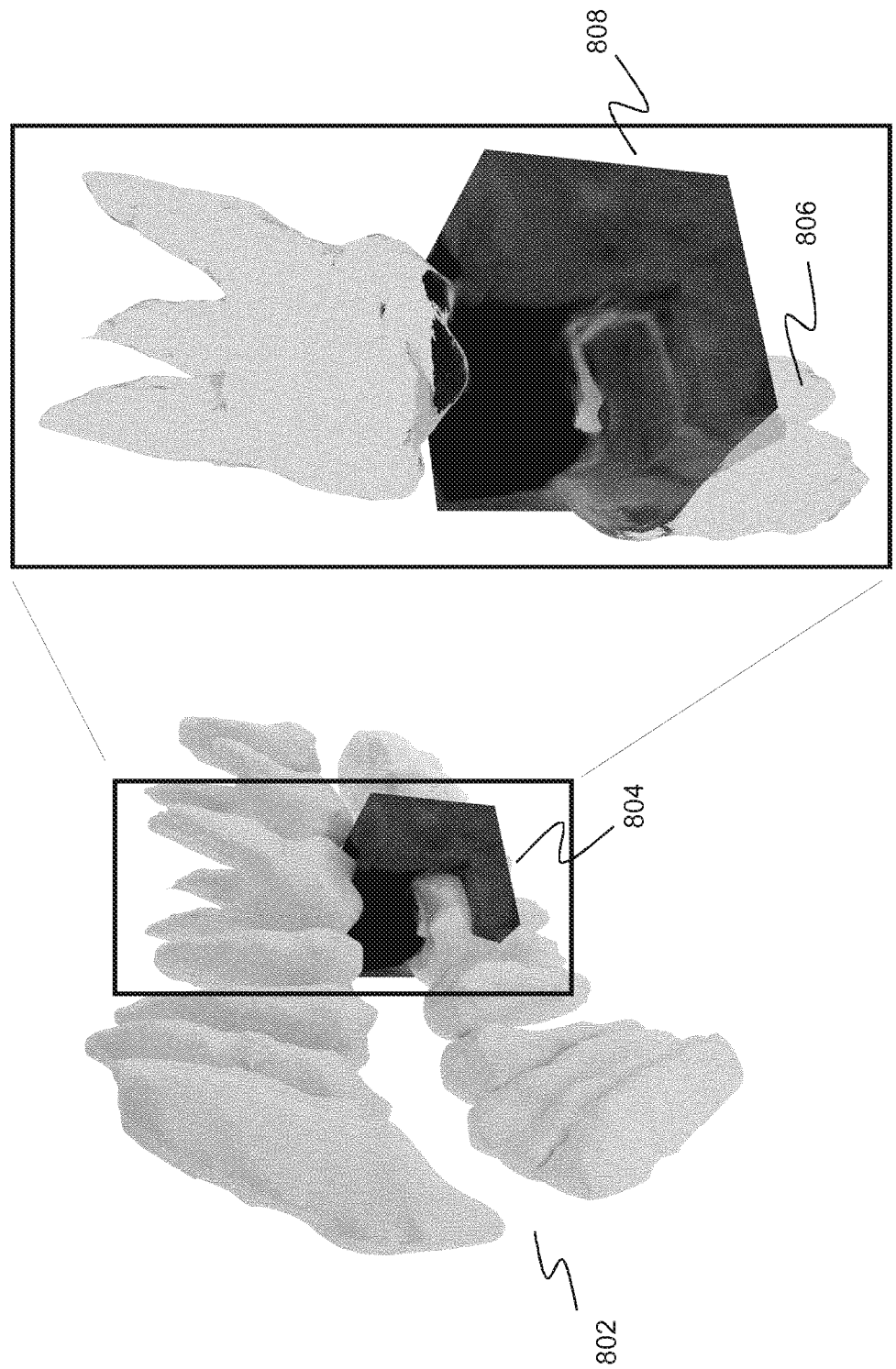

AUTOMATED CORRECTION OF METAL AFFECTED VOXEL REPRESENTATIONS OF X-RAY DATA USING DEEP LEARNING TECHNIQUES

CROSS-REFERENCE TO RELATED APPLICATION

The Application is a Continuation Application of International Application No. PCT/EP2019/060813, filed Apr. 26, 2019 and published as WO 2019/207144 on Oct. 31, 2019, in English.

FIELD OF THE INVENTION

The invention relates to automated correction of metal affected voxel representations of x-ray data using deep learning techniques, and, in particular, though not exclusively, to methods and systems for correction of metal affected voxel representations of x-ray data using deep learning techniques, methods for training a deep neural network system to correct a voxel representation of metal affected x-ray, and a computer program product for executing such methods.

BACKGROUND OF THE INVENTION

During CT scanning, different areas of a tissue are exposed at different angles by an x-ray radiation beam of a predetermined intensity while an array of sensors measures the intensity of the x-ray beam that travelled through the tissue. Based on the attenuated radiation beam measured by the sensors, the absorption of the x-ray radiation at different areas in the tissue can be determined. The data obtained during scanning have the form of a set of sine-wave signals with different amplitudes and phases, commonly referred to as a sinogram. A reconstruction algorithm may use the sinogram to reconstruct a 2D or 3D image of the scanned tissue. Such reconstruction algorithm is typically referred to as backprojection.

When a tissue includes a material (or materials) that have a high absorption coefficient that strongly deviates from the absorption coefficients of biological material problems may occur when trying to reconstruct an image based using backprojection. E.g. in the field of dentistry, metal implants and/or dental fillings, which usually are made from relatively high-density metallic materials (e.g. amalgam, gold, silver, palladium, titanium, etc.) that have a higher absorption coefficient) may introduce inconsistencies in the constructed images, e.g. seemingly missing data points or incorrect data points, that are not representative of the actual tissue or other structure density value that is scanned. These inconsistencies caused by high-density materials may be generally referred to as metal artefacts or in short artefacts (note that the term 'artifact' instead of 'artefact' is often used in literature).

Artefacts may pose a serious problem as it may interfere with a diagnostic process, e.g. a diagnostic process executed by a medical specialist or by an automated computer-based diagnosis system. The problem of artefacts is enhanced by the general trend of dose reduction in CT examinations due to the fact that the use of short-wavelength ionizing radiation raises concerns about potential health hazards. A drawback of dose reduction is the increase in noise in reconstructed CT images. Further, in medical fields such as oral surgery, endodontics and orthodontics, small CT scanners such as cone beam CT (CBCT) scanners are increasingly used. A CBCT scanner is a compact low-dose scanner wherein the x-ray beam has the shape of a cone. Although the CBCT technique shares many similarities with conventional CT scanning techniques, there are also substantial differences. For example, as CBCT uses an 2D array of sensors and a cone-beam shaped x-ray beam, cone beam reconstruction algorithms different from typical reconstruction algorithms of conventional CT scanners. Moreover, in CBCT scans the radio density, measured in Hounsfield Units (HUs), is not consistent because different areas in the scan appear with different greyscale values depending on their relative positions in the organ being scanned. HUs measured from the same anatomical area with both CBCT and medical-grade CT scanners are not identical and are thus unreliable for determination of site-specific, radiographically-identified measured density. Due to this differences detrimental effects of high-density material will appear differently in an image depending on the type of scanner and backprojection technique.

An overview of the general 'types' of artefacts is described e.g. in the article by Schultze, et al., *Artefacts in CBCT: a review*, Dentomaxillofacial Radiology, 2011 July; 40(5): pp. 265-273, which identifies various types of artefacts including: extinction artefacts, beam hardening artefacts, exponential edge gradient effect (EEGE) ring artefacts, aliasing artefacts, and motion artefacts of which the first three are of particular importance. Extinction artefacts can be regarded as 'missing value' artefacts. Such artefacts appear when a scanned object contains a highly-absorbing material, e.g. a gold crown. In that case, the high-density metal 'hides' the material that is directly behind it. These areas cannot be properly accessed by the radiation beam resulting in 'black areas' next to the highly absorbing materials. Beam hardening artefacts are mostly caused by the inversely proportional relationship between the high-density material and/or a high atom number and the low-wavelength photons of the x-rays source. Due to the absorption of photons by the high-density materials, relatively more absorption is recorded in the path behind the metal object, the error is backprojected into the volume which results in black streaks in the image. Further, exponential edge gradient effects (EEGE) emerge when two neighbouring structures have a high contrast in density and/or atom number. Because the backprojection algorithm averages the measured intensity over the recorded beam, it causes streaks in the direction of the x-ray projection next to the metal.

Hence, multiple sources may contribute to the appearance of artefacts in CT images that are reconstructed based on sinograms. Aspects that relate to the high-density material (thickness, density, atom number, etc.), as well as aspects that relate to the scanner, scanning method (e.g. scanner type, sensor type, sensor geometry, sensor quality, the wavelength of the x-ray source, etc.) and reconstruction method may contribute to the severity and the way these artefacts appear in a reconstructed image. These factors make removal of artefacts from CT data a challenging problem.

A range of methods have been proposed to reduce artefacts in CT images, while preserving important details in the image. These methods are referred to as metal artefact reduction (MAR) methods. Common MAR methods include linear interpolation, beam hardening correction methods and normalized metal artefact reduction methods. As explained in the article of Meyer et al. *Normalized metal artifact reduction NMAR) in computed tomography*, Medical Physics, Vol. 37, No. 10, October 2010, pp. 5482-5493, common MAR methods are executed in the sinogram-domain, i.e. before transforming the sinogram into a pixel or voxel-based image. These methods treat the parts of the projected data that are affected by metal as missing data. A thresholding method is used to determine one or more metal objects in an image and a forward projection of a metal-only image can be used to determine the signals in the sinogram that are affected by the metal. Then interpolation and forward projection techniques are applied to the sinogram to replace affected data with surrogate data. Such MAR techniques require access to sinogram data and knowledge of the scanning and backprojection method that is used when the sinogram was generated. Moreover, the techniques use multiple forward and backward projection computations as well as image thresholding which require substantial computational resources. Hence, despite improvements, current MAR techniques do not provide a generic solution which is capable of automatically removing or at least reducing artefacts in x-ray data in an efficient and reliable way.

Recently neural networks have been used in a MAR process. Zhang et al (2017) describe in their article "*Convolutional Neural Network based Metal Artifact Reduction in X-ray Computed Tomography*", the reduction of artefacts in CT images by means of a 2D Convolutional Neural Network (CNN) that was trained on the basis of images that were processed on the basis of conventional MAR methods in order to enable the CNN to learn useful information for artefact reduction. Metal artefacts where simulated computationally. The CNN generates an image prior that is subsequently processed in the sinogram domain together with the original uncorrected data and the metal trace data to form a corrected sinogram. The corrected sinogram was transformed into a corrected image. Reduction of the artefacts was achieved but the remaining artefacts were still considerable. In a study by Gjetseby et al "*Deep learning methods for CT image-domain metal artefact reduction*", SPIE, Vol. 10391, 25-9-2017, a combination of a state-of-the-art sinogram domain NMAR technique and a 2D-CNN is applied to specifically reduce metal streak on 2D images. An image is first reconstructed by the NMAR technique, resulting in a reconstructed image with considerable remaining metal streak artefacts. The reconstructed image is then fed to the input of the 2D CNN CNN for determining a reconstructed CT-image with reduced metal streaking.

In many practical situations one has only access to a voxel (or pixel) representation of CT data (e.g. in a DICOM format) and no or little technical knowledge about the system that generated the CT data. Zhang et al (2018) apply a type of Convolutional Neural Network called a U-Net to simulated contaminated (affected by several image distortions) images and reference images to obtain an operator (trained by the U-net) used to predict a residual image, i.e. the discrepancy between these contaminated and reference images, and thus aims to mimick the reference image. Data is numerically simulated by inserting phantom metal into clean CT-images of abdominals. Their results on simulated data seem promising, although application to real-world images do not exceed conventional methods due to the regular MAR methods used to create their 2D CT-image reference dataset.

Hence, from the above it follows there is a need in the art for improved methods and systems for automatic reconstruction of 3D data, such as voxels, which are affected by artefacts. In particular, it is desired that artefacts caused by high-density materials in a voxel representation of tissue (generated on the basis of sensor data of a (CB)CT scanner) are automatically identified by such improved methods and systems and replaced by voxels that provide an accurate estimate of voxel values without the artefact present, while keeping the voxels of the high-density material, e.g. such as titanium implants or composite fillings, intact.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an aim of the embodiments in this disclosure to automatically correct metal affected voxel representations of x-ray data using deep learning techniques. Preferably the x-ray data are represented as voxels forming a 3D image and generated using a low-dose CT scanner such as a cone beam CT (CBCT) scanner. The 3D images typically represent biological tissues e.g. the dento-maxillofacial region of the body or other regions such as the thorax region. Here, metal affected x-ray data, e.g. voxels, may represent artefacts in the x-ray data caused by metal or metallic objects in a volume of tissue that is imaged by an x-ray imager.

In one aspect, the invention relates to a computer-implemented method for correction of a voxel representation of metal affected x-ray data, comprising: a first 3D deep neural network receiving an initial voxel representation of metal affected x-ray data at its input and generating voxel identification information at its output, the voxel identification information identifying at least voxels of the initial voxel representation that belong to a region of voxels that are affected by metal; a second 3D deep neural network receiving the initial voxel representation and the voxel identification information generated by the first 3D deep neural network at its input and generating a corrected voxel representation at its output, the corrected voxel representation including voxel estimations for voxels that are identified by a voxel map as being part of a metal affected region, the first 3D deep neural being trained on the basis of training data and reference data that include voxel representations of clinical x-ray data of a predetermined body part of a patient. In an embodiment, the x-ray data may be 3D (CB)CT data Hence, a first neural network is trained to automatically distinguish between voxels of a voxel representation that are associated with metal affected x-ray data (an artefact) and voxels that do not belong to an artefact, i.e. voxels representing tissue of the body part that is scanned. This information may be generated at the output of the first neural network in the form of voxel identification information. The information may be used by a second neural network in order to replace voxels values of the voxel representation of metal affected x-ray data that belong to the artefact with voxel values that are estimated by the second neural network on the basis of clinical training data. This way, the method may provide an effective way of removing artefacts from x-ray images, 3D (CB)CT image data, without the need for specific knowledge of the x-ray imager (imager being considered another term for scanner) or the backprojection method that was used to generate the image. Additionally, the method does not need to process projected data in the sinogram domain.

In an embodiment, the first 3D deep neural network determining identification information includes: the first 3D deep neural network generating a voxel map, each voxel of the voxel map being associated with a voxel of the initial voxel representation of metal affected x-ray data and one or more probability measures, wherein a first probability measure of the one or more probability measures represents the probability that the voxel is part of a metal region and a second probability measure represents the probability that the voxel is part of a metal affected region. In this respect, Voxel map' may be considered as (a subset of and/or part of) voxel identification information. Region in this respect should be considered the set or sets of voxels being part of the real-world 3D volume or volumes respectively being metal (or metallic) in the case of the first measure, and the set or sets of voxels having incorrect values determined in the initial voxel representation due to being affected by metal present in the real-world situation in the case of the second measure.

In an embodiment, the method may further comprise classifying voxels in the initial voxel representation based on the first and second probability measures and based on one or more threshold values, into voxels that belong to a metal region and voxels that belong to a metal affected region.

In an embodiment the method may further comprise using the first probability measure and one or more metal threshold values to determine for each voxel a metal class selected from a plurality of metal classes, preferably the plurality of metal classes including a first metal class associated with non-metal materials and a second class of voxels associated with metals or metallic materials.

In an embodiment, the first 3D deep neural network and/or the second 3D deep neural network comprises at least a first data processing path including at least a first set of 3D convolutional layers, preferably a first set of 3D CNN feature layers, and at least a second data processing path parallel to the first path, the second path comprising a second set of 3D convolutional layers, preferably a second set of 3D CNN feature layers, the second set of 3D convolutional layers being configured to determine contextual information associated with blocks of voxels that are fed to the input of the first set of 3D convolutional layers.

In an embodiment, the training data may include voxel representations of clinical x-ray data of the body part of the patient before a metal-based treatment of the body part and voxel representations of clinical x-ray data of the body part of the patient after a metal-based treatment of the body part and wherein the reference data include voxel representations of clinical x-ray data of the body part of the patient before a metal-based treatment in which a metal region associated with the metal-based treatment of the body part is identified as such. (Subsets and/or processed versions of) such reference data may be utilized to optimize towards an accurate generation a voxel map, and in effect the voxel identification information, as mentioned above.

In an embodiment, the second 3D deep neural network may be trained to minimize artefacts associated with metal affected x-ray data in the initial voxel representation, wherein during training the 3D deep neural network is parameterized by first weights and biases selected to optimize a corrected voxel representation based on the relationships following from the one or more characteristics of the training data and the one or more characteristics of the reference dataset.

In an embodiment, the first and/or second 3D deep neural network may include and/or may be part of a 3D convolutional neural network, a 3D generative adversarial neural network or a 3D recurrent deep neural network.

In an aspect, the invention may relate of computer-implemented method for training a deep neural network system to correct a voxel representation of metal affected x-ray data comprising: a computer receiving training data and reference data, wherein the training data include voxel representations of clinical x-ray data of the body part of the patient before a metal-based treatment and voxel representations of clinical x-ray data of the body part of the patient after a metal-based treatment and wherein the reference data include voxel representations of clinical x-ray data of the body part of the patient before the metal-based treatment in which a metal region associated with the metal-based treatment is identified as such; the computer receiving voxel maps associated with the voxel representations of clinical x-ray data of the body part of the patient after a metal-based treatment, a voxel map identifying metal affected voxels in a voxel representation of clinical x-ray data of the body part of the patient after a metal-based treatment; and, the computer using the training data and the reference data to train the 3D deep neural network to generate voxel predictions for voxels that are classified by the voxel map as voxel belonging to a metal affected region and to correct the metal affected voxels in a voxel representation of metal affected x-ray data on the basis of the voxel predictions.

In a further aspect, the invention relates to a method for training a neural network to process a voxel representation of metal affected x-ray data to produce voxel estimations for voxels that are part of a metal affected region using a training dataset and reference dataset, the method comprising: generating a set of training data including voxel representations of x-ray data of a body part of a patient before a metal-based treatment, voxel representations of metal affected x-ray data after a metal-based treatment of the body part of the patient after a metal based treatment and a voxel map, identifying if voxels in a voxel representation of the metal affected x-ray data belong to a metal region and/or a metal affected region; generating a reference data set including voxel representations of x-ray data of the body part of the patient before the metal-based treatment; training a generator neural network, preferably a generator 3D deep neural network, that is parameterized by first weights and biases following from one or more characteristics of the training data and one or more characteristics of at least a section of the reference dataset, wherein the generator neural network is trained to generate a corrected voxel representation, the corrected voxel representation including voxel estimations for voxels that are identified by a voxel map as being part of a metal affected region. wherein the training of the generator 3D deep neural network includes modifying one or more of the first weights and biases to optimize the corrected voxel representation based on the relationships following from the one or more characteristics of the training data and the one or more characteristics of the reference dataset; and, training a discriminator neural network, preferably a discriminator 3D deep neural network, that is parameterized by second weights and biases following from one or more characteristics of the corrected voxel representations that include voxel estimations for voxels that are part of a metal affected region and one or more characteristics of at least a section of the reference dataset, wherein the discriminator 3D deep neural network is trained to discriminate voxel representations of metal affected x-ray data from the processed voxel representations. Information resulting from the discriminator 3D deep neural network may be utilized during optimization of the generator 3D deep neural network.

In yet another aspect, the invention relates to a method of correction of a voxel representation of metal affected x-ray data, preferably 3D (CB)CT data, comprising: receiving an initial voxel representation representing metal affected x-ray data; generating a corrected voxel representation from the initial voxel representation by using a generator 3D deep neural network trained to minimize artefacts associated with metal affected x-ray data in the initial voxel representation, the generator 3D deep neural network being parameterized by first weights and biases selected to optimize the processed voxel representation based on the relationships following from the one or more characteristics of the training data and the one or more characteristics of the reference dataset, having utilized information resulting from a discriminator 3D deep neural network during said optimization and training of said generator 3D deep neural network.

In an embodiment, the generator 3D deep neural network and/or the discriminator 3D deep neural network may be configured as a 3D convolutional neural network and/or a 3D deep recurrent neural network.

In a further aspect, the invention may relate to a computer system adapted to correct a voxel representation of metal affected x-ray data, preferably 3D (CB)CT data, comprising: a computer readable storage medium having computer readable program code embodied therewith, the program code including a pre-processing algorithm and at least a trained first 3D deep neural network, the computer readable program code; and a processor, preferably a microprocessor, coupled to the computer readable storage medium, wherein responsive to executing the first computer readable program code, the processor is configured to perform executable operations comprising: providing a first voxel representation of metal affected x-ray data to the input of a first 3D deep neural network receiving voxel identification information at the output of the first 3D deep neural network, the voxel identification information identifying at least voxels of the first voxel representation that belong to a region of voxels that are affected by metal; providing a second 3D deep neural network receiving the first voxel representation and the voxel identification information generated by the first 3D deep neural network at its input and generating for each voxel of the first voxel representation identified by the voxel identification information, a predicted voxel value at its output, the second 3D deep neural network predicting the predicted voxel value on the basis of training data and reference data that include voxel representations of clinical x-ray data of a predetermined body part of a patient; and, determining a corrected first voxel representation including the predicted voxel values at the voxel positions as identified by the voxel map.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 8A and 8B depict examples of a voxel representation as may be utilized used in the embodiments in this application;

DETAILED DESCRIPTION

Figure 1:
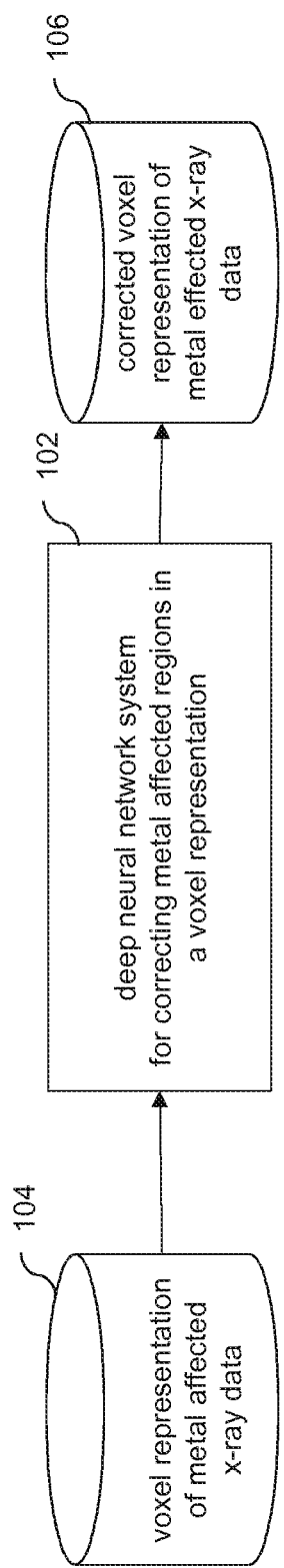
FIG. 1 depicts a high-level overview of a system for automatically correcting voxel representations of metal affected x-ray data according to an embodiment of the invention.

FIG. 1 depicts a high-level overview of a system configured to automatically correct voxel representations of metal affected x-ray data according to an embodiment of the invention. As shown in FIG. 1, the system includes a 3D deep neural network system 102 comprising an input for receiving a voxel representation of x-ray data 104 that comprises one or more artefacts. The voxel representation of the x-ray data may be generated by different x-ray imagers, such as an CT imager or an CBCT imager. The artefacts are caused by metal or metallic objects, e.g. in the field of dentistry, implants or dental fillings, that are present in the volume of tissue that is imaged by the x-ray imager. When a voxel representation of x-ray data is generated based on a backprojection process, the voxel values of certain voxels will be affected by the metal or metallic objects. The metal affected voxel values may represent artefacts in the voxel representation of the x-ray data, which can substantially degrade the quality of the images. The 3D deep neural network system 102 is configured to automatically detect artefacts and generate a corrected voxel representation 106 of the x-ray data in which the artefacts are removed or at least substantially reduced. In particular, 3D deep neural network system 104 is configured to reduce the presence of metal artefacts to such an extent that the artefacts do not interfere with the ability of a user to clearly perceive different tissues and corresponding shapes, while leaving crucial information about the metal objects, such as titanium implants or composite fillings, intact.

Figure 2:
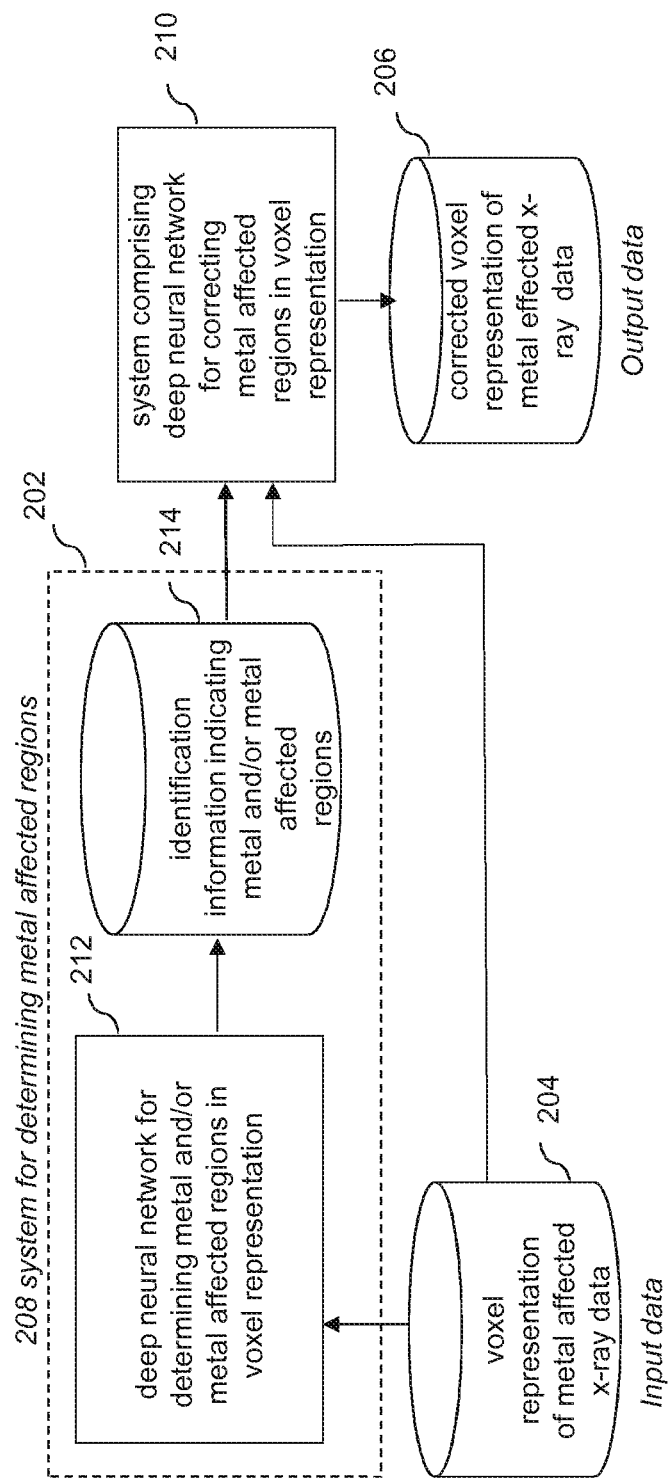
FIG. 2 depicts a system configured to automatically correct voxel representations of metal affected x-ray data according to an embodiment of the invention.

FIG. 2 depicts a system configured to automatically correct voxel representations of metal affected x-ray data according to an embodiment of the invention. As shown in this figure, the system 202 may include a first system component 208 including a first 3D deep neural network 212 for identification of metal-affected voxels in voxel representations of x-ray data 204. The metal-affected voxels may form a metal-affected region—an artefact—in the voxel representation. The first system component 208 may function as a pre-processor for a second system component 210 comprising a second 3D deep neural network. The first 3D deep neural network may process input data, i.e. voxel representations of metal affected x-ray data, and generate output data which is input to the second system component that comprises a second 3D deep neural network that is configured to correct voxels values that are part of a metal affected region. The first 3D deep neural network is trained to generate identification information for identifying whether at least part of the voxel values of the voxels of the first voxel representation is part of a metal affected region (an artefact) and/or a metal or a metallic region (e.g. an implant or a tooth filling).

In an embodiment, the identification information may include a 3D voxel map, which may have the form of a voxel representation having dimensions that match the voxel representation of the metal affected x-ray data presented at the input of the first 3D deep neural network. This way, each voxel in the voxel map may have a corresponding voxel in the voxel presentation of the x-ray data. Each voxel of the voxel map may be associated with one or more probability measures, which can be used for determining whether a voxel value of a corresponding voxel in the first voxel representation is part of a metal affected region or a metal region. If the one or more probability measures is (are) above a certain threshold value or within a certain range, then the system may determine that a voxel belongs to a metal region to a metal affected region. If a voxel belongs to a metal affected region, the system may determine that the voxel value should be corrected.

Hence, the first 3D deep neural network is configured to generate identification information, e.g. in the form of a 3D map object localizing volumes of interests in a voxel representation of x-ray data belonging to metal affected regions or metal regions. Further, the first 3D deep neural network may be trained to recognise the volumes in a voxel representation that contain metal or a metallic material and assign a 'material class' to it, e.g. titanium, gold, amalgam, composite, etc. As shown in FIG. 2, the second 3D deep neural network receives the identification information and the voxel representation of the metal affected x-ray data at its input and to generate a corrected voxel representation of the x-ray data in which the artefacts are removed or at least substantially reduced.

Figure 3:
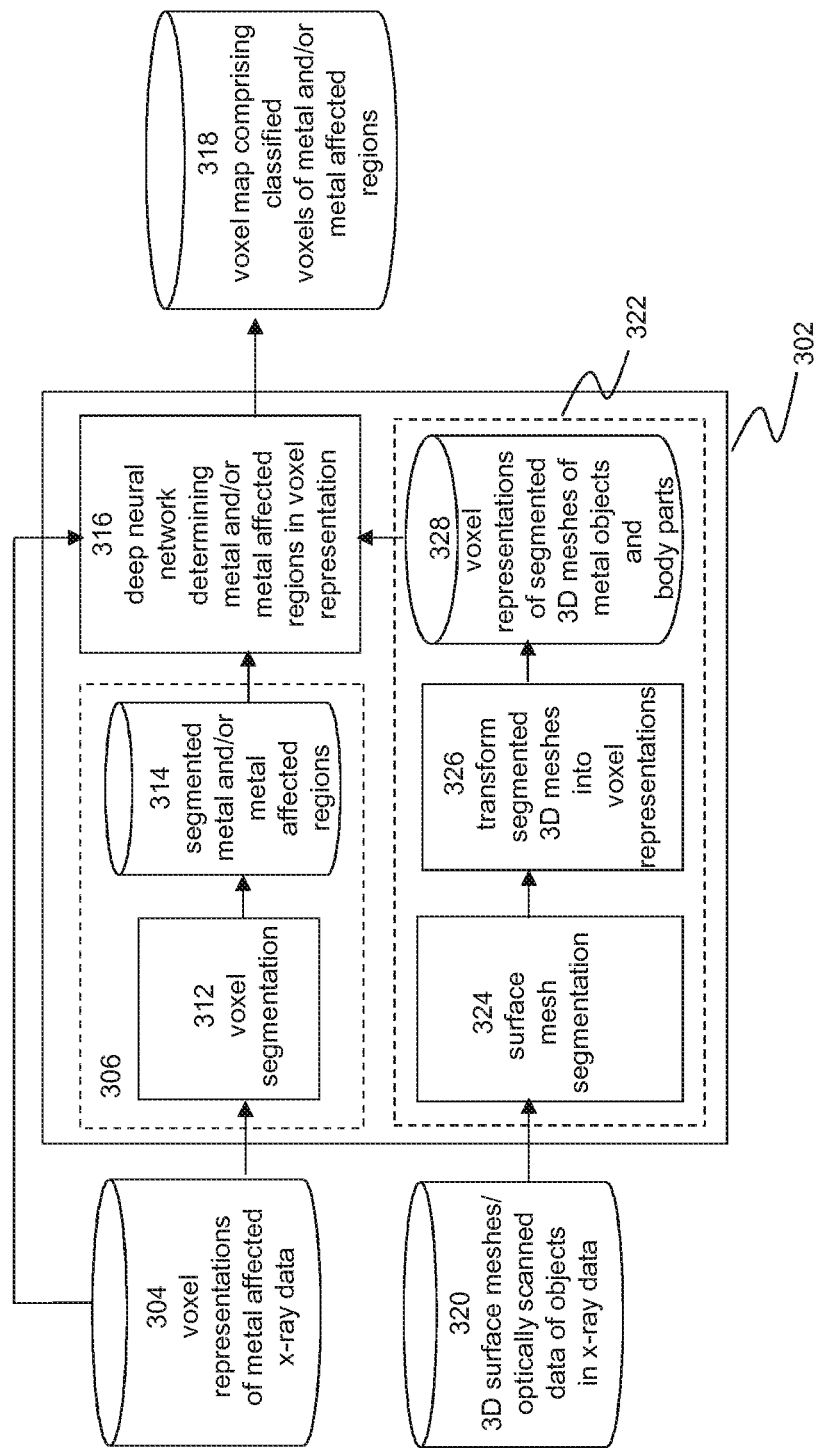
FIG. 3 depicts a system for determining metal affected regions in a voxel representation according to an embodiment of the invention.

FIG. 3 depicts a system for determining metal affected regions in a voxel representation according to an embodiment of the invention. The system may be implemented as a computer system 302 configured to receive a voxel representation of metal affected x-ray data 304 and to determine metal affected regions in the voxel representation using a trained 3D deep neural network that is configured to determine metal and/or metal affected regions in the voxel representation. The voxel representations of metal affected x-ray data 304 may include a 3D image data stack of a dento-maxillofacial structure, including tissue structures of a body part, e.g. jaw-, teeth- and nerve structures in a dento-maxillofacial structure and including metal or metallic structures that are present in the structures of the body part (e.g. dental filling and/or (part of) a dental implant). A voxel representation of x-ray data may comprise voxels, i.e. 3D space elements associated with (at least) a voxel value, e.g. a grayscale value or a colour value, representing a radiation intensity or radio density value. Such radio density value may be measured in Hounsfield Units (HU). The voxel representation may define a voxel space, i.e. a volume of voxels having certain dimensions. A voxel representation may include a 3D image data stack representing (CB)CT x-ray data of a predetermined format, e.g. the DICOM format or a derivative thereof. During scanning the presence of metal in the biological tissue will affect the x-ray data and the sensing of the x-ray data by the sensors of the x-ray imager. Therefore, the voxel values that are derived from the x-ray data may be affected by the metal structures. Hence, the voxel representation of the metal affected x-ray data 304 comprises metal affected voxels forming one or more artefacts, which may substantially deteriorate the quality of the image data. This is a substantial problem in x-ray imaging, in particular in low dose x-ray imaging such as CBCT x-ray scanning.

The system of FIG. 3 may be implemented as system component (and may be considered as a pre-processor) in the system described with reference to FIG. 2. The system has a training mode and an inference mode. In the training mode, the 3D deep neural network 316 may be trained according to a predetermined training scheme so that the trained neural network is capable of accurately classifying voxels of the voxel representation of metal affected x-ray data into voxels of different classes (e.g. voxels associated with different metals, metal affected regions, etc.). The deep neural network is trained to generate a voxel map 318 comprising classified voxels of metal and/or metal affected regions as an output. Voxel representations of metal affected x-ray data may be used for determining a training set. In the inference mode, a new voxel representation of metal affected x-ray data may be offered to the input of the trained 3D deep neural network and—in response—the neural network will generate a voxel map identifying voxels of metal and metal affected regions in input data.

The 3D training data may include labelled voxel representations of metal affected x-ray data. Additionally, the voxel representations of metal affected x-ray data may be segmented 312 into voxel representations of metal regions and voxel representations of metal affected regions 314. These data may be generated on the basis of a manual segmentation process or on the basis of an automated segmentation process using e.g. a trained neural network. An automated segmentation system for segmenting voxel representations of x-ray data is described in a related European patent application 17179185.8 of the same applicant with title "classification and 3D modelling of 3D dento-maxillofacial structures using deep learning networks", which is hereby incorporated by reference into this application.

In CBCT scans the radio density measured in Hounsfield Units (HU) is inaccurate because different areas in the scan appear with different greyscale values depending on their relative positions in the organ being scanned. HU measured from the same anatomical area with both CBCT and medical-grade CT scanners are not identical and are thus unreliable for determination of site-specific, radiographically-identified bone density. Moreover, CBCT systems do not employ a standardized system for scaling the grey levels that represent the reconstructed density values. These values are—as such—arbitrary and do not allow for assessment of bone quality. In the absence of such a standardization, it is difficult to interpret the grey levels or even impossible to compare the values resulting from different machines. For example, in a CBCT voxel representation of a dento-maxillofacial structure, teeth and jaw bone structure have similar density so that it is difficult for a computer to distinguish between voxels belonging to teeth and voxel belonging to a jaw. Additionally, CBCT systems are very sensitive for artefacts referred to as beam hardening, which produce dark streaks between two high attenuation objects (such as metal or bone), with surrounding bright streaks.

In order to make the 3D deep neural network robust against the variability present in e.g. current-day CBCT-type voxel representations, in an embodiment, the 3D training data may also include (high-resolution) 3D models of metal objects or non-metal objects that may appear in the voxel representation of the metal affected x-ray data 304. The 3D models may include 3D surface meshes of metal objects and/or 3D surface meshes of non-metal objects, such as body parts (bone tissue or teeth) in the x-ray data. Such 3D surface meshes may be generated by e.g. a well-known optical (laser) scanner or an intra-oral optical scanner for generating 3D meshes of teeth. In some cases, a 3D surface mesh needs to be segmented in order to separate relevant structures. Segmentation module 324 may segment a 3D surface mesh (e.g. an intra-oral scan of teeth) into individually segmented objects, e.g. a plurality of 3D surface meshes wherein each surface mesh represents a tooth. Segmenting 3D surface meshes into individual 3D surface meshes is a well-known technique in the art. In a further step (not shown) segmented surface meshes may be aligned with the segmented voxel representations. The (aligned) segmented surface meshes may then be transformed 326 into voxel representations, e.g. a binary voxel representation, wherein voxel values of voxels representing the surface of an object, e.g. a tooth, and voxels positioned within an object, are set to a first value, e.g. 1, and voxels outside the object are set to a second value, e.g. 0. The thus obtained voxel representations of the 3D models 328 may be used as additional training data in order to train the deep neural network to accurately determined metal and metal affected regions in a voxel representation of metal affected x-ray data.

Figure 4:
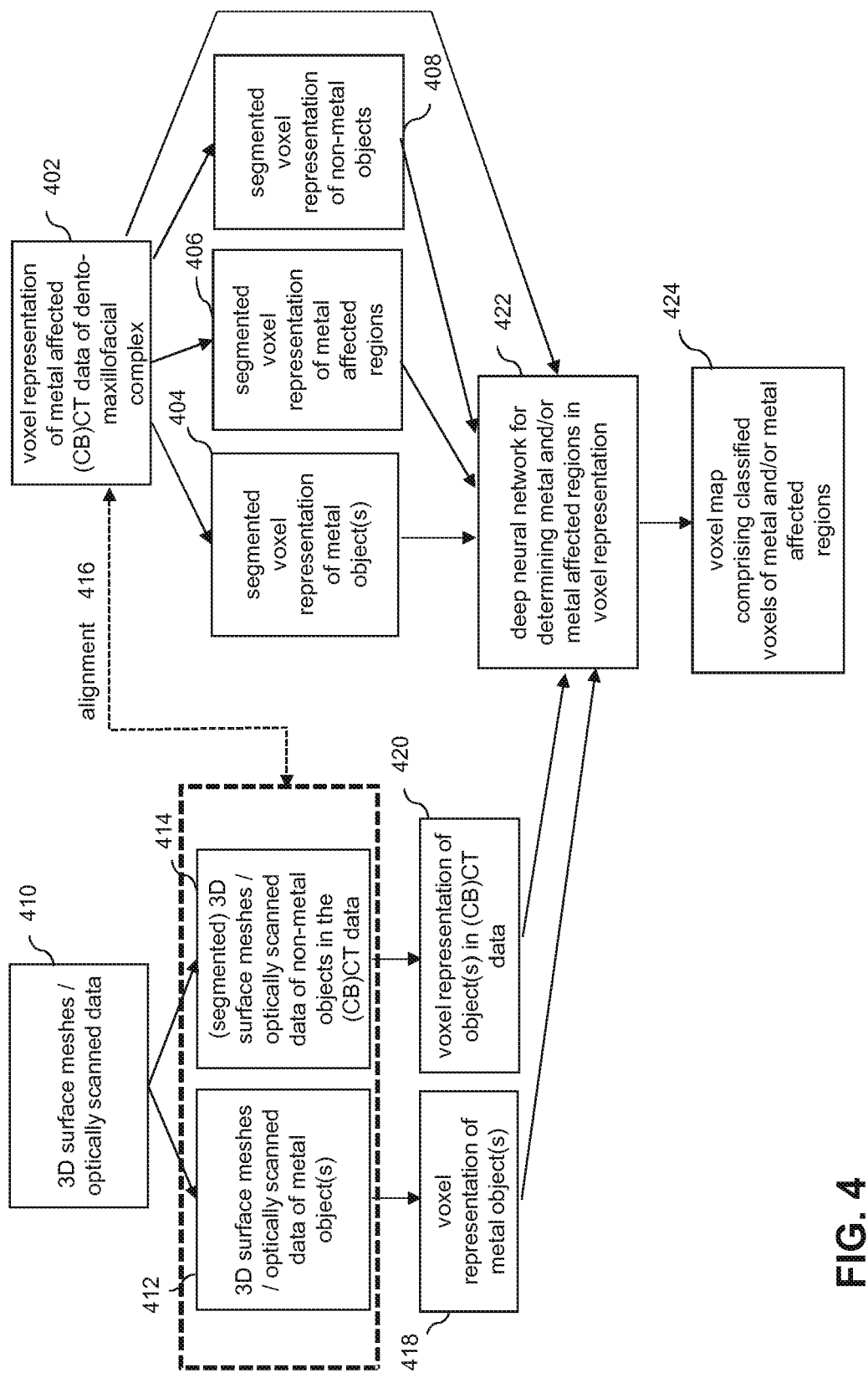
FIG. 4 depicts a method of training a 3D deep neural network to classify voxel representations of metal affected x-ray data according to an embodiment of the invention.

FIG. 4 depicts a method of training a 3D deep neural network to classify voxel representations of metal affected x-ray data according to an embodiment of the invention. In particular, FIG. 4 depicts the training of a 3D deep neural network to classify voxel representations of metal affected (CB)CT data 402 of a dento-maxillofacial complex. As shown in this figure, the first 3D deep neural network may be trained on the basis of labelled metal affected voxel representations, e.g. the voxel representations of metal affected (CB)CT data 402, as well as labelled voxel representations which are derived (segmented) from the metal affected voxel representations representing metal objects 404 (e.g. implants and fillings), and metal affected regions (artefacts) 406. Additionally, in some embodiment, the 3D deep neural network may also be trained on the basis of non-metal objects 408 (teeth and bone structures) that are labelled as non-metal objects.

The voxels of these voxel representations are labelled with respect to the class of materials the voxel belongs to. In an embodiment, the classes of materials may include: metal, non-metal, metal affected (artefact) and non-metal (non-artefact). Further, the voxel space of all these voxel representations is identical to the voxel space of the input of the first 3D deep neural network. The target training data represent a set of 3D voxel maps, one voxel map per voxel representation of metal affected (CB)CT data. A 3D voxel map has a voxel space of the same dimensions as the voxel representations that are fed to the input of the neural network, so that each voxel of the 3D voxel map corresponds with a voxel of a voxel representation offered to the input of the 3D deep neural network. Each voxel in the 3D voxel map is associated with voxel information indicating whether a corresponding voxel of a voxel representation at the input of the first 3D deep neural network is part of a metal object and/or a metal affected object.

In an embodiment, additional 3D data may be used to train the first 3D deep neural network. As already described with reference to FIG. 3, the 3D deep neural network may be made robust against the variability present in e.g. current-day CBCT-type voxel representations. This may be realized by 3D training data derived from (high resolution) 3D models of metal objects or non-metal objects. In an embodiment, high resolution 3D surface meshes of metal objects 412 in (CB)CT data of a dento-maxillofacial complex, e.g. crowns and/or implants, may be generated using e.g. a 3D optical scanner, and subsequently transformed into voxel representations of metal object(s) 418. Voxels of the voxel representation may be labelled in order to identify voxels that represent metal of a certain class. Similarly, labelled voxel representations of non-metal objects 420 in (CB)CT data of a dento-maxillofacial complex, e.g. teeth and/or jaw bones, may be generated on the basis of 3D surface meshes 414.

In some embodiments, some of the 3D surface meshes of metal or non-metal objects may be the same objects depicted in the voxel representation of the metal affected (CB)CT data 402 of the dento-maxillofacial complex. In that case, segmented 3D surface meshes, e.g. a predetermined tooth, may be aligned (superimposed) 416 to the segmented voxel representation 408 of the same tooth in the voxel representation of the metal affected (CB)CT data of the dento-maxillofacial complex. Labelled voxel representations of the metal and non-metal objects derived from the 3D surface meshes may be used as training data for training the first 3D deep neural network for classifying metal affected regions and/or metal regions. Such an alignment may be performed by a separate 3D deep neural network.

This way the 3D deep neural network is trained to classify voxels of a voxel representation in metal regions and metal affected regions and generate a 3D voxel map indicating the classification of each voxel in the voxel representation. For each voxel, the 3D deep neural network may generate voxel information. In an embodiment, the voxel information may include a vector including one or more probability measures. A probability measure provides information about the chance that a voxel belongs to a certain class, e.g. the metal class. The metal material class may define a number of different metals, e.g. titanium, gold, amalgam, etc. During training the deep neural network may learn that voxels representing metallic objects that can be found in the jaw/bone/teeth should be classified as metal. These metallic objects are part of the original image(stack) and thus should be kept intact. Additionally, the neural network will learn that voxels which are classified as a metal and located 'external' to the voxels that represent the metal or metallic objects (i.e. outside the boundaries of the metal objects) should be classified as metal affected voxels (i.e. voxels that are part of an artefact).

For example, it may be the case that a voxel value as determined by an imager, is a value that would be related to metal. However, the voxel may be positioned outside a volume of voxels that are known from the available information to be correctly classified as metal. In that case, the trained 3D deep neural network may determine that the voxel value, e.g. a radio density measured in Hounsfield Units (HU), is a value that is affected by a metal or metallic object that is located in the neighbourhood of the voxel. The first 3D deep neural network may determine in that case that the voxel should be classified as a metal affected voxel that needs to be corrected by a second 3D deep neural network (as described in FIG. 2).

Figure 5A:
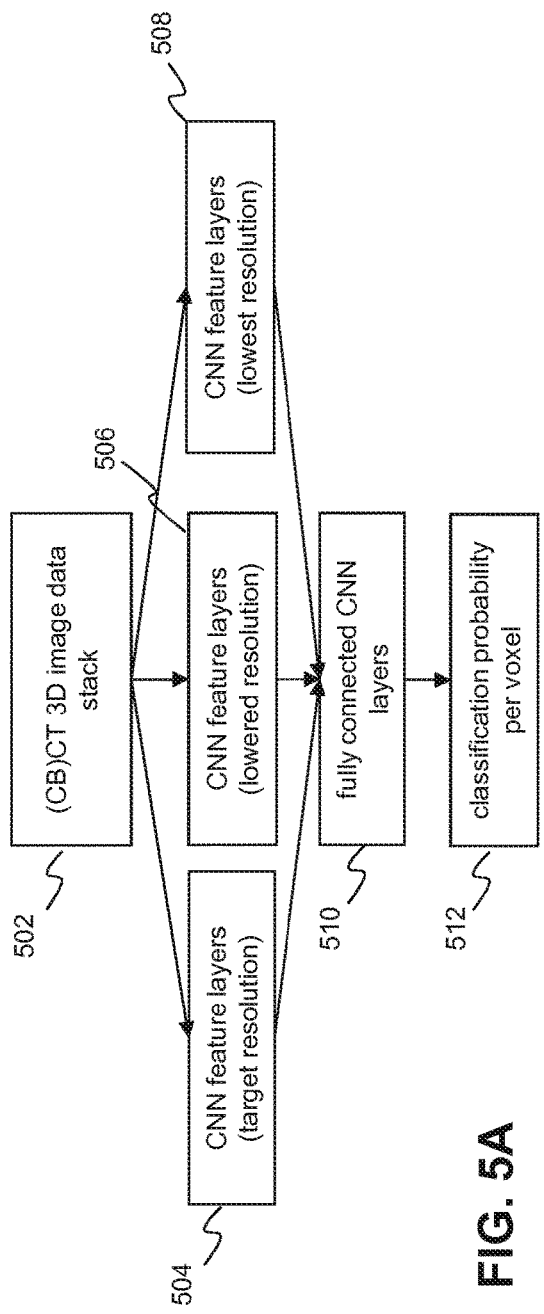
FIGS. 5A and 5B depict examples of a 3D deep neural network architecture for classifying voxel representations of metal affected x-ray data according to an embodiment of the invention.
Figure 5B:
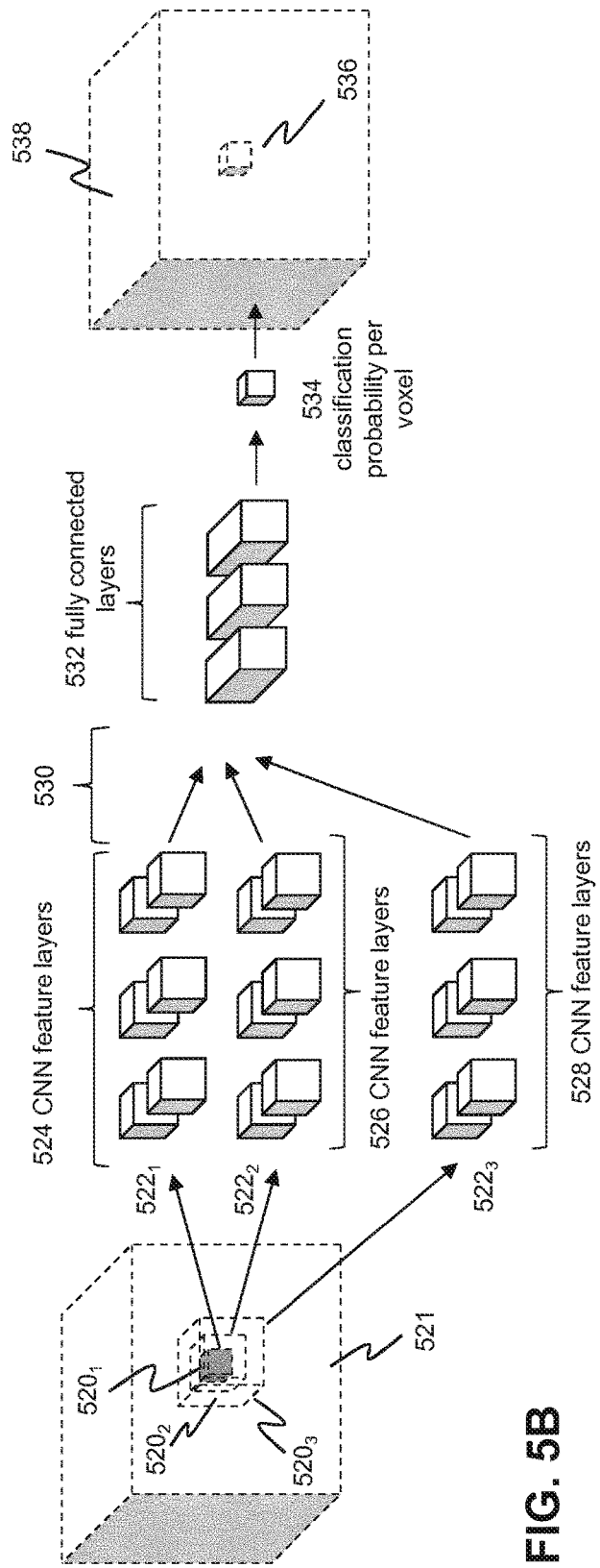

FIGS. 5A and 5B depict examples of a 3D deep neural network architecture for classifying voxel representations of metal affected x-ray data according to an embodiment of the invention. As shown in FIG. 5A, the network may be implemented using 3D convolutional neural networks (3D CNNs). The convolutional layers may use an activation function. A plurality of 3D convolutional layers may be used wherein minor variations in the number of layers and their defining parameters, e.g. differing activation functions, kernel amounts and sizes, and additional functional layers such as dropout layers may be used in the implementation without losing the essence of the design of the 3D deep neural network.

As shown in FIG. 5A, the network may include a plurality of convolutional paths. For example, in an embodiment, the network may include at least a first convolutional path associated with a first set of 3D convolutional layers 504, a second convolutional path associated with a second set of 3D convolutional layers 506 and a third convolutional path associated with a third set of 3D convolutional layers 508. The output of the convolutional paths may be merged and the result may be processed by a fully connected layer 510 which is configured to output probability per class per voxel. A voxel representation of metal affected x-ray data 502, 3D CT image data, may be fed to the inputs of both the first, second and third convolutional paths.

The function of each of the different convolutional paths is illustrated in more detail in FIG. 5B. As shown in this figure, voxels representing the 3D image data are fed to the input of the neural network. These voxels may define a predetermined volume, which may be referred to as the image volume 521. The image volume may be partitioned in a set of first blocks $520_1$ and each of the 3D convolutional layers of the first path $522_1$ may perform a 3D convolution operation on first blocks of voxels $501_1$ of the 3D image data. During the processing, the output of one 3D convolutional layer is the input of a subsequent 3D convolutional layer, for set of layers 524. This way, each 3D convolutional layer may generate a 3D feature map representing parts of the 3D image data that are fed to the input. A 3D convolutional layer that is configured to generate such feature maps may therefore be referred to as a 3D CNN feature layer.

As shown in FIG. 5B, the convolutional layers of the second path $522_2$ may be configured to process a set of second blocks of voxels $520_2$ of the 3D image data, wherein a second block of voxels represents a down-sampled version of an associated first block of voxels, wherein the first and second block of voxels have the same centered origin. The down-sampling factor may be any appropriate value, preferably the down-sampling factor being selected between 2 and 4, preferably 3.

The first path $522_1$ may define a first set of 3D CNN feature layers (e.g. 5-20 layers) 524, which are configured to process input data (e.g. first blocks of voxels at predetermined positions in the image volume) at the voxel resolution of the target (i.e. voxels of the image volume that are classified). The second path may define a second set of 3D CNN feature layers (5-20 layers) 526, which are configured to process second blocks of voxels wherein each block of the second blocks of voxels $520_2$ has the same center point as its associated block from the first block of voxels $520_1$. These voxels however are processed at a resolution that is lower than the resolution of $520_1$. Hence, the second blocks of voxels represent a larger volume in real-world dimensions than the first blocks. The second 3D CNN feature layers process voxels in order to generate 3D feature maps that includes information about the direct neighbourhood of associated voxels that are processed by the first 3D CNN feature layers. This way, the second path enables the neural network to determine contextual information, i.e. information about the context (e.g. its surroundings) of voxels of the 3D image data that are presented to the input of the neural network. A third path $522_3$ may be utilized, having a set of 3D convolutional layers 528, representing an even larger contextual and more highly down-sampled part of input data $520_3$. This down-sampling factor may again be set at an appropriate value selected between 5 and 15, preferable, 9 from the original input resolution.

Although FIG. 5B depicts a network including three convolutional paths $522_{1-3}$, other embodiments including even more convolutional paths are also envisaged. By using three paths or more convolutional paths, both the 3D image data (the input data) and the contextual information about voxels of the 3D image data can be processed in parallel. The contextual information is important for classifying complex voxel representations such as dento-maxillofacial structures, which typically include closely packed and/or similar dental structures that are difficult to distinguish without a larger contextual region.

The plurality of 3D CNN feature layers may be trained (through their learnable parameters) to derive and pass on the optimally useful information that can be determined from their specific input, the fully connected layers 532 may encode parameters that will determine the way the information from the three previous paths should be combined to provide optimal probabilities of classified voxels 534. Thereafter, probabilities 536 may be presented in the image space 538 of the output that may have the dimensions of the image space of the input. Hence, the output of the 3D deep neural network are classification probabilities per voxel in an image space that corresponds to the image space of the voxels at the input.

An optimization method may be used to learn the optimal values of the network parameters of the 3D deep neural network by minimizing a loss function which represents the deviation between the output of the 3D deep neural network and the target data (i.e. classified voxel data), representing the desired output for a predetermined input. When the minimization of the loss function converges to a certain value, the training process could be considered to be suitable for application. Activation functions for individual layers may differ and may e.g. be set as linear, sigmoid, tanh, and/or ReLu.

Figure 6:
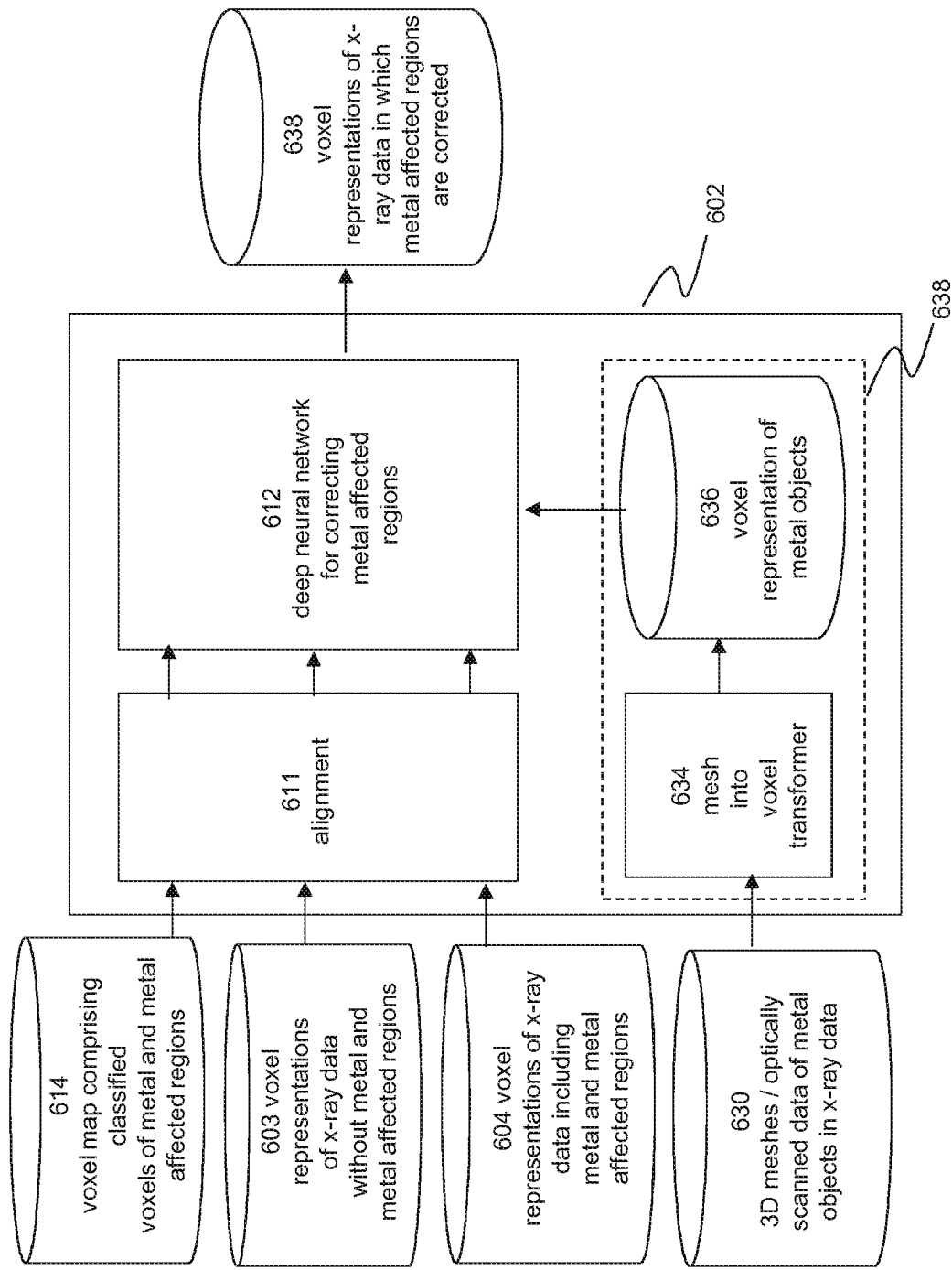
FIG. 6 depicts a system for correcting voxel representations of metal affected x-ray data according to an embodiment of the invention.

FIG. 6 depicts a system for correcting voxel representations of metal affected x-ray data according to an embodiment of the invention. In particular, this figure depicts a computer system 602 for correcting voxel representations of metal affected x-ray data using a 3D deep neural network 612 that is trained for correcting metal affected regions in the voxel representation. The system has a training mode and an inference mode. In the training mode, the 3D deep neural network 612 may be trained according to a predetermined training scheme so that the trained neural network is capable of accurately predicting voxels values of voxels in a voxel representation that are affected by metal. The deep neural network is trained to generate a voxel representation of x-ray data 638 in which the metal affected regions are corrected. In the inference mode, a new voxel representation of metal affected x-ray data may be offered to the input of the trained 3D deep neural network and—in response—the neural network will generate a voxel representation that is similar to the voxel representation at the input with the exception that metal affected voxels are corrected. Hence, the 3D deep neural network is trained such that the output provides an accurate approximation of the original 3D image without metal induced artefacts.

The 3D training data may include labelled voxel representations of a patient before and after treatment, in particular, e.g. in the field of dentistry, a metal based treatment (e.g. implant placements, tooth restorations, orthodontic appliances, bridge placements, root canal fillings, root posts, osteosynthesis plates and screws). In other words, it includes a first labelled voxel representation 603 of part of a patient before treatment (i.e. before a metal object was implanted in the body part of the patient) and a second labelled voxel representation 604 of the same part of the same patient after treatment (i.e. after a metal object was implanted in the body part of the patent). Further, in an embodiment, the training data may also include a voxel map 614 of the voxel representation 604 of x-ray data including metal and metal affected regions as generated by the first deep neural network. The voxel map is utilized for training the second 3D deep neural network 612 to recognise which voxels relate to metal affected regions (artefacts) that need to be corrected.

In an embodiment, before being fed to the input of the 3D deep neural network, an alignment process 611 may be applied to the training data, i.e. the labelled voxel representations 603, 604 and, when applicable, the voxel map 614. In this alignment process, structures in the voxel representations may be aligned with respect to each other. This may be performed manually or automatically. In the field of image registration, various methods are known considering automatic alignment such as methods based on keypoint detection, intensity-based methods, etc.

The training data may further include target data including a target voxel representation of x-ray data of part of the patient wherein the voxel representation includes a metal object (due the metal-based treatment) but wherein the metal affected regions are absent. Such target voxel representation may be constructed on the basis of the voxel representations of the x-ray data before and after a treatment and the voxel map that identifies metal regions and metal affected regions. In particular, the voxel map may be used to identify voxels of a metal region in the voxel representation after treatment. These voxels may be appropriately represented (inserted) in the voxel representation before treatment, thereby generating a realistic ground truth on the basis of clinical data. An example of generating such target data is described in more detail with reference to FIG. 7A.

Per patient, a set of training data is generated including the above-described input and target data. Then, the training data are used to train the 3D deep neural network for correcting metal affected regions as identified by the voxel map. Examples of training the 3D deep neural network are described hereunder in more detail with reference to FIG. 7-10.

During training the 3D deep neural network will learn on the basis of the clinical training data to generate realistic voxel predictions for voxels in voxel representations that are affected by metal. The 3D deep neural network will further learn to generate a voxel representation of the metal affected x-ray data in which the metal affected voxels are replaced by the voxel predictions. This way a voxel representation of metal affected x-ray data is generated in which voxels associated with metal affected regions are corrected on the basis of the voxel predictions generated by the 3D deep neural network.

Figure 7A:
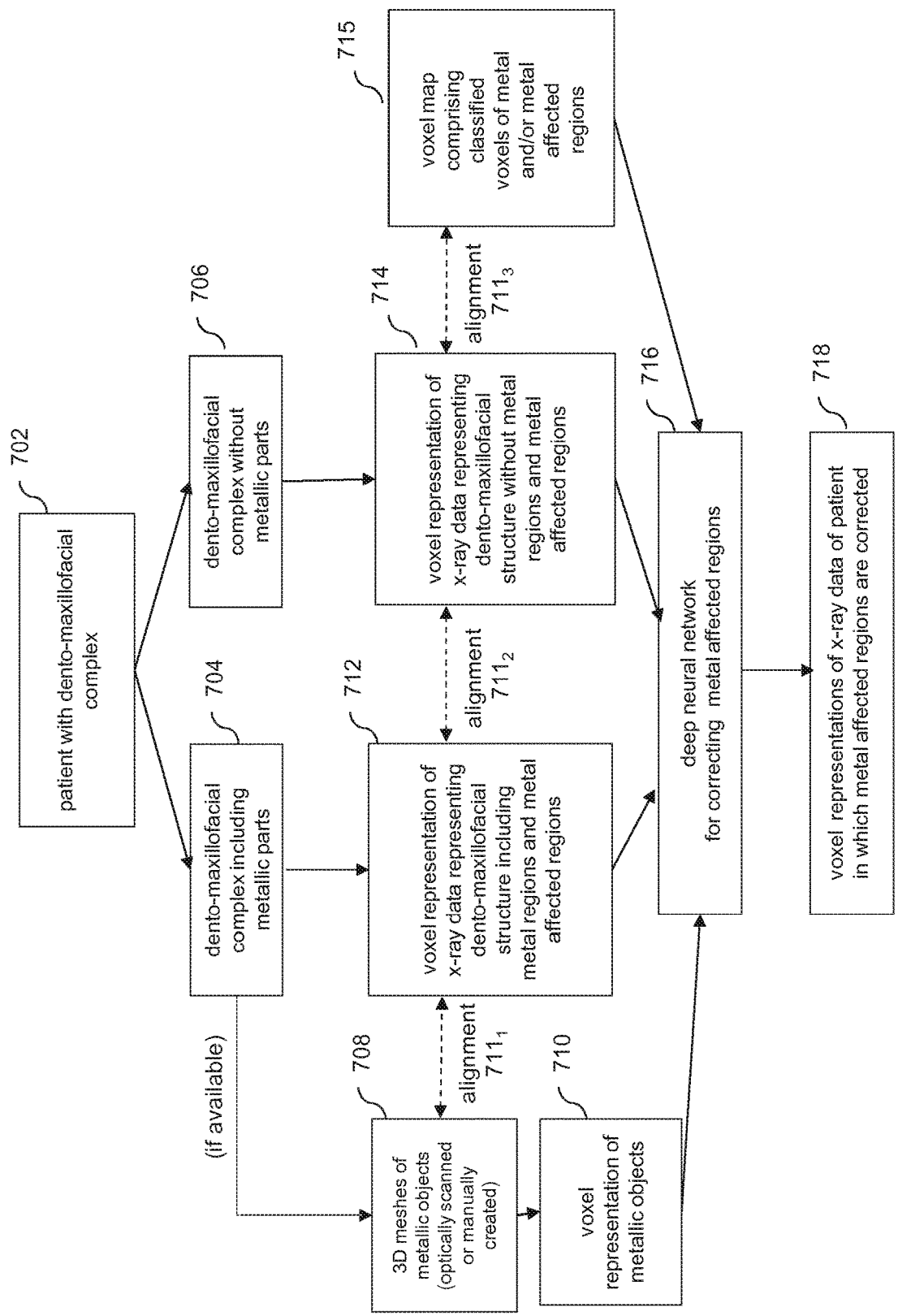
FIGS. 7A and 7B depict a method of training a 3D deep neural network to correct voxel representations of metal affected x-ray data according to an embodiment of the invention.
Figure 7B:
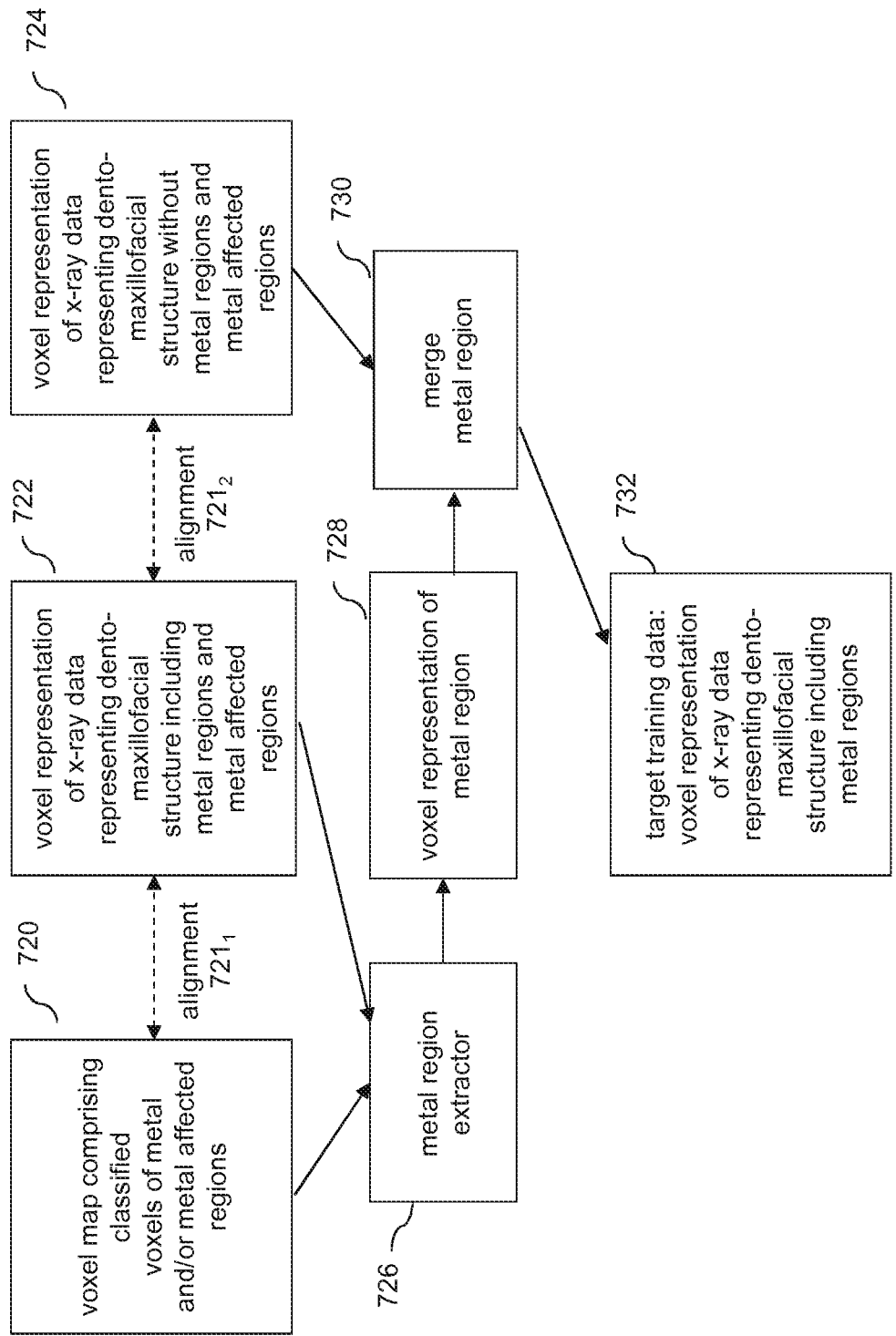

FIGS. 7A and 7B depict a method of training a 3D deep neural network for correcting voxel representations of metal affected x-ray data according to an embodiment of the invention. In particular, FIG. 7A depicts a schematic of training of a 3D deep neural network to classify voxel representations of metal affected (CB)CT data of a dento-maxillofacial complex. As shown in this figure, the first 3D deep neural network may be trained on the basis of training data that are derived from dento-maxillofacial complex data of patients 702, i.e. x-ray images before treatment 706 and after treatment 704 of a patient, including labelled voxel representation of x-ray data representing dento-maxillofacial structure including metal regions and metal affected regions 712, voxel representation of x-ray data representing dento-maxillofacial structure without metal regions and metal affected regions 714 and a voxel map 715 identifying voxels of metal and/or metal affected regions in voxel representation 712. In some embodiments, the 3D deep neural network may also be trained on the basis of a voxel representation of metallic objects 710 that were used during the treatment of the patient. 3D surface meshes 708 of such metallic objects may be generated using a 3D optical scanner and derive a voxel representation from each of the 3D meshes wherein the voxel representation has the same dimensions as the other voxel representations that are used as training data.

When applicable, the various representations of 3D data such as voxel representations and/or surface meshes may again be aligned to appropriately coincide in a same voxel space. This may be done manually or automatically $711_{1,2,3}$.

Additionally, accurate and realistic target data may be generated on the basis of the image(stack) of x-ray data before and after treatment and the voxel map. This process is depicted in more detail in FIG. 7B. As shown in this figure, the target voxel representation may be derived from aligned $721_{1,2}$ voxel representations before and after the treatment of the patient and the voxel map. The voxel map 720 may be used to identify the voxels in the voxel representation 722 of the metal affected x-ray data that belong to a metal region. A metal extractor module 726 may be used to generate a voxel representation of the metal region 728 that may have the same dimensions as the voxel representations of the metal affected x-ray data. This voxel representation may be merged 730 with the voxel representation of the x-ray data of the patient before treatment into a target voxel representation of x-ray data representing dento-maxillofacial structure including metal regions, but excluding the metal affected voxel regions (artefacts) 732.

Training the 3D deep neural network on the basis of clinical training data will result in a trained 3D deep neural network that is capable of generating realistic voxel predictions for voxels in voxel representations that are affected by metal.

FIGS. 8A and 8B depict examples of a voxel representation as may be utilized in the embodiments in this application. In particular, FIG. 8A depicts an overview of a 3D mesh 802 of a dento-maxillofacial structure (in this case a set of teeth) and a voxel representation 804 (a DICOM 3D data set) of part of a metal-treated tooth of part of the 3D mesh, wherein part of the voxels is associated with metal affected x-ray data. For the purpose of this figure, the voxel representation is positioned within the 3D mesh so that it coincides with the part of the 3D mesh it belongs to. FIG. 8B illustrates an enlarged part of the same voxel representation 808 and the 3D mesh of the tooth 806 it belongs to. The figure clearly illustrates the dimensions of the voxel representation depicting a sample size (64 voxels wide, long and high in the case of this particular example) that may be used for training the neural networks described in this disclosure.

Figure 9A:
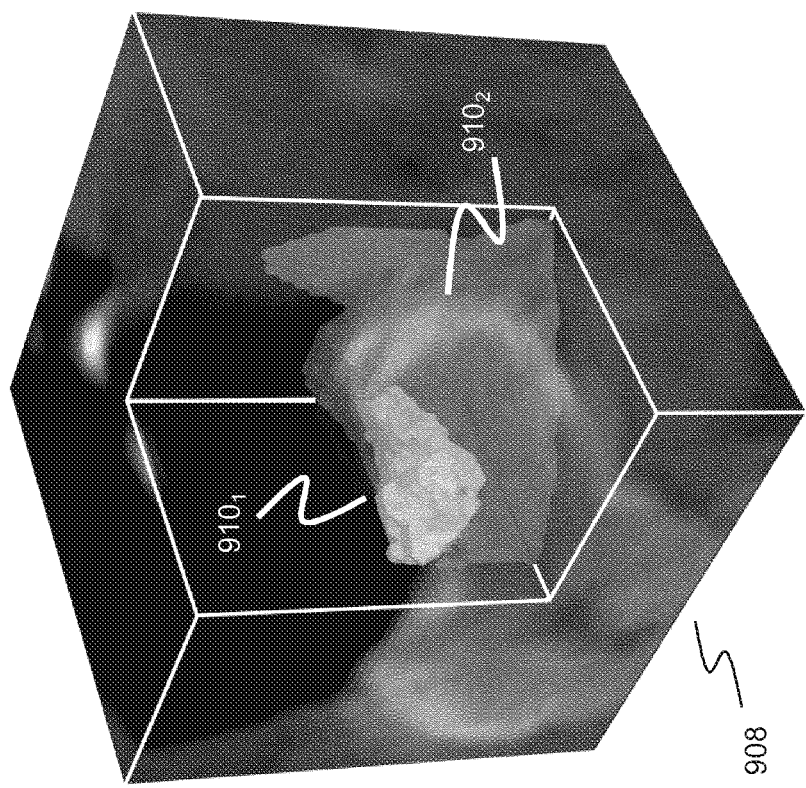
FIG. 9A-9C depict voxel representations as may be utilized or generated by the embodiments in this disclosure.
Figure 9B:
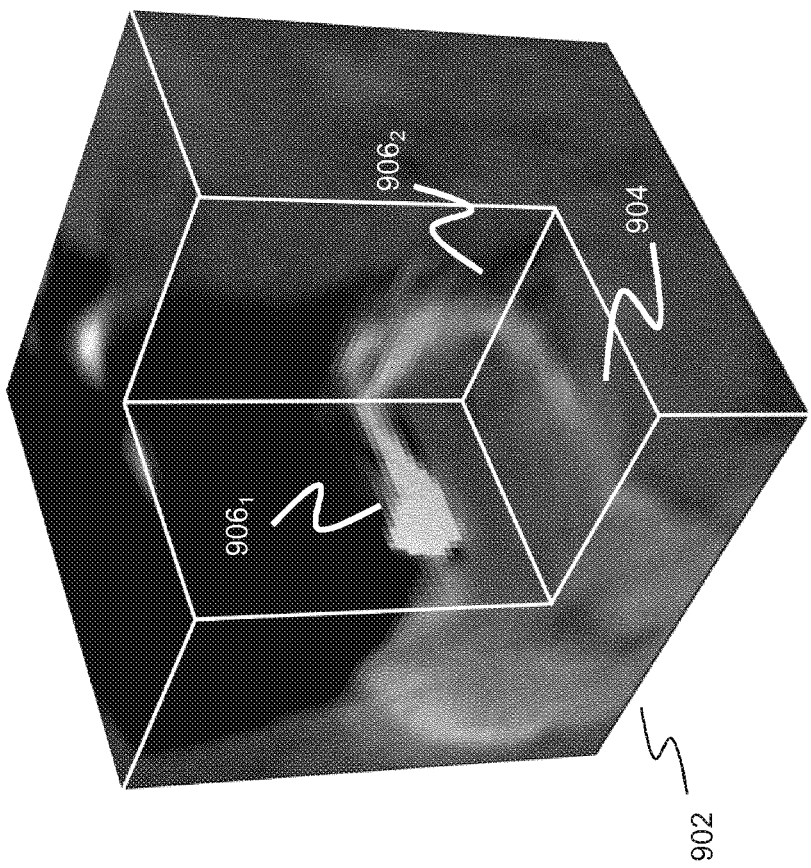
Figure 9C:
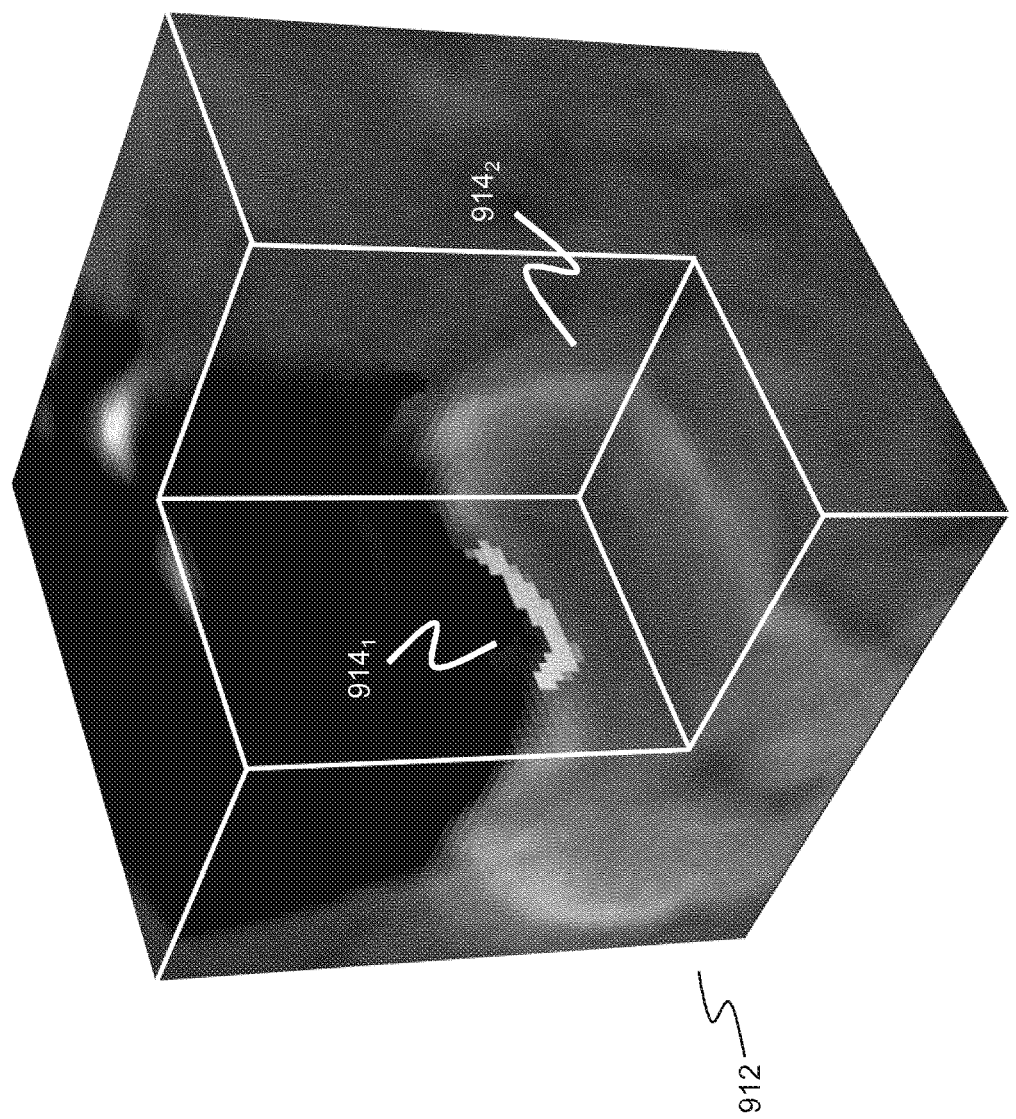

FIG. 9A-9C depict voxel representations as may be utilized or generated by the embodiments in this disclosure. The voxel representations may relate to the same part of the dento-maxillofacial structure as depicted in FIGS. 8A and 8B. In particular, FIG. 9A depicts a voxel representation comprising metal regions and metal affected regions that may be used as input data to a system for automatically correcting voxel representations of metal affected x-ray data. In the figure, a block of voxels is removed so that it possible to look 'within' the voxel representation. In FIG. 9A the white region 906$_1$ represents a metal region and a number of black regions 906$_2$ around the (white) metal region represent metal affected regions.

FIG. 9B depicts the voxel representation 808 again having the block of voxels that have been left out. For this block of voxels, a voxel map has been generated by a 3D deep neural network as described with reference to FIG. 3. The voxel map is depicted in FIG. 9B and includes classified voxels of metal region(s) 910$_1$ and voxels of metal affected region(s) 910$_2$, which require correction by a further 3D deep neural network. Finally, FIG. 9C depicts a voxel representation of the metal affected x-ray data of a patient in which metal affected regions are corrected 914$_2$, while the metal region 914$_1$ is retained. The correction is realized by the 3D deep neural network which is trained to correct metal affected regions as described with reference to FIG. 6.

Figure 10:
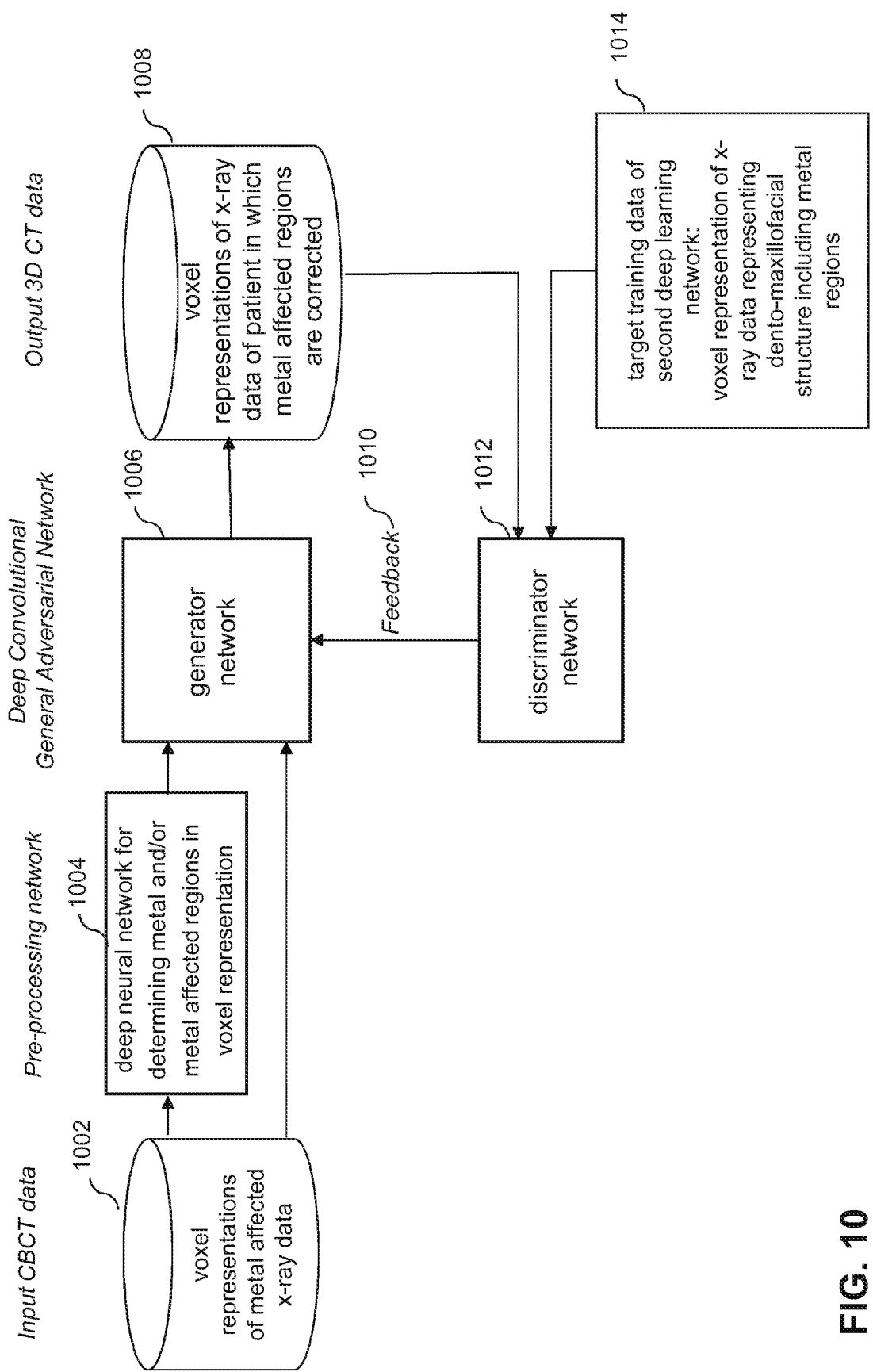
FIG. 10 depicts a schematic of a system for correcting voxel representations of metal affected x-ray data based on a generative adversarial network according to an embodiment of the invention.

Different neural network architectures may be used in the embodiments in this disclosure. FIG. 10 depicts a schematic of a system for correcting voxel representations of metal affected x-ray data based on a generative adversarial neural network according to an embodiment of the invention. As shown in this figure, the 3D deep neural network 1006 that needs to be trained for correcting voxels of metal affected regions, is referred to as the generator network. During training, the generator network receives voxel representations 1002 of metal affected x-ray data and associated voxel maps (possibly generated by a 3D deep neural network 1004 that is configured to determine metal and/or metal affected regions in voxel representations). Additionally, the generator network may receive feedback 1010 from a discriminator network 1012, which either receives a target training voxel representation of x-ray data representing a dento-maxillofacial structure including metal regions, i.e. an image(stack) following the 'real-life' situation, which may subsequently be considered the same as 'the target voxel representation' 732, 1014. This is fed to the second 3D deep neural network as target training data or it receives a voxel representation as generated by the generator network 1008, i.e. the voxel representation in which metal affected regions are corrected. The main task of the discriminator network is to distinguish whether the voxel representation it receives as input is either a corrected output voxel representation of the generator network or the target voxel representation 732, 1014. The discriminator in return receives feedback if the output it has given was correct, i.e. if the voxel representation was indeed 'corrected' or 'real' as the discriminator indicated. This information helps the generator network to effectively learn replacing metal affected voxels with realistic voxel predictions for those areas, since both generator and discriminator learn from the given feedback.

Figure 11:
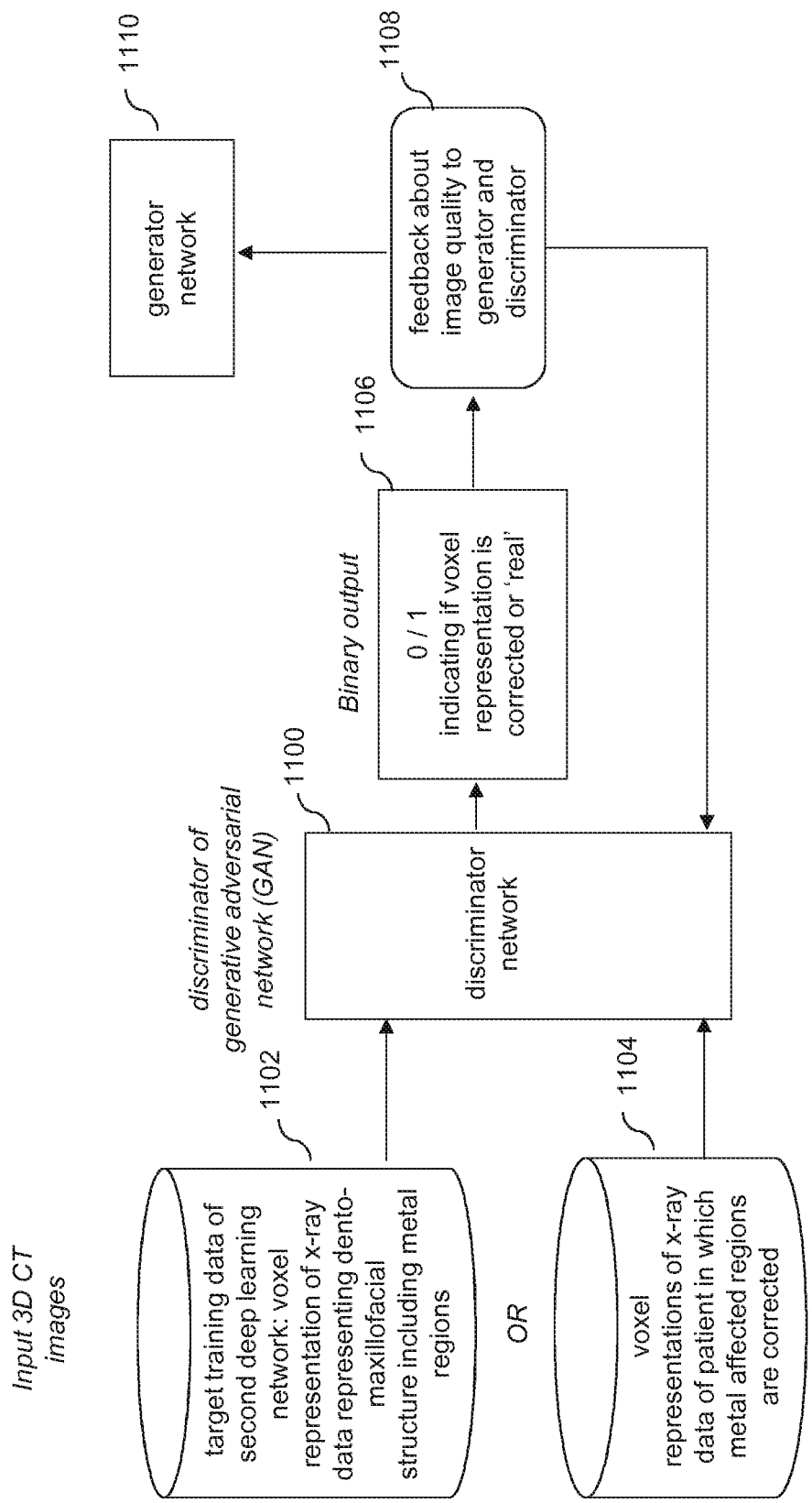
FIG. 11 depicts a schematic of a discriminator part of a generative adversarial network according to an embodiment of the invention.

FIG. 11 depicts the discriminator network in more detail. Here, the discriminator network 1100 is configured to distinguish between the target voxel representation and voxel representations for which voxels of metal affected regions are corrected. Hence, during training, the discriminator network may be (randomly) presented with either the target voxel representation or the output voxel representation of the generator network 1008. In response, the discriminator network generates an indication whether the voxel representation at the input of the discriminator is a 'real' target voxel representation or a corrected voxel representation as created by the generator network. The discriminator network will then generate a 'score' indicating whether the presented voxel representation is real or corrected. For example, in an embodiment, the discriminator may have a binary output 1106 wherein a '1' may indicate that the voxel representation is a target representation 1102 and a '0' may indicate that the voxel representation is a corrected voxel representation 1104. If during training the generator network generates a corrected voxel representation which the discriminator can distinguish from target voxel representations, then this will be a signal for the system that such corrected voxel representations are not sufficiently 'realistic'. Hence, this way, the generator network will be stimulated to produce corrected voxel representations which are similar with regards to the target voxel representations of the training set, e.g. the clinical training data as described with reference to FIGS. 7A and 7B.

The more realistic the voxel predictions generated by the generator network, the more challenging it is for the discriminator to distinguish between both. Hence, the ability of the discriminator to distinguish between both is a measure of the quality of the voxel corrections generated by the generator. This information may be fed back to the discriminator 1100 as well as the generator network 1110 through back-propagation 1108. This way, the generator is trained to generate accurate voxel predictions for voxels of metal affected regions. The deep neural network 1102 representing the generator network of the GAN may be any type of 3D deep neural network, including a (deep) convolutional neural network or a recurrent neural network.

Figure 12B:
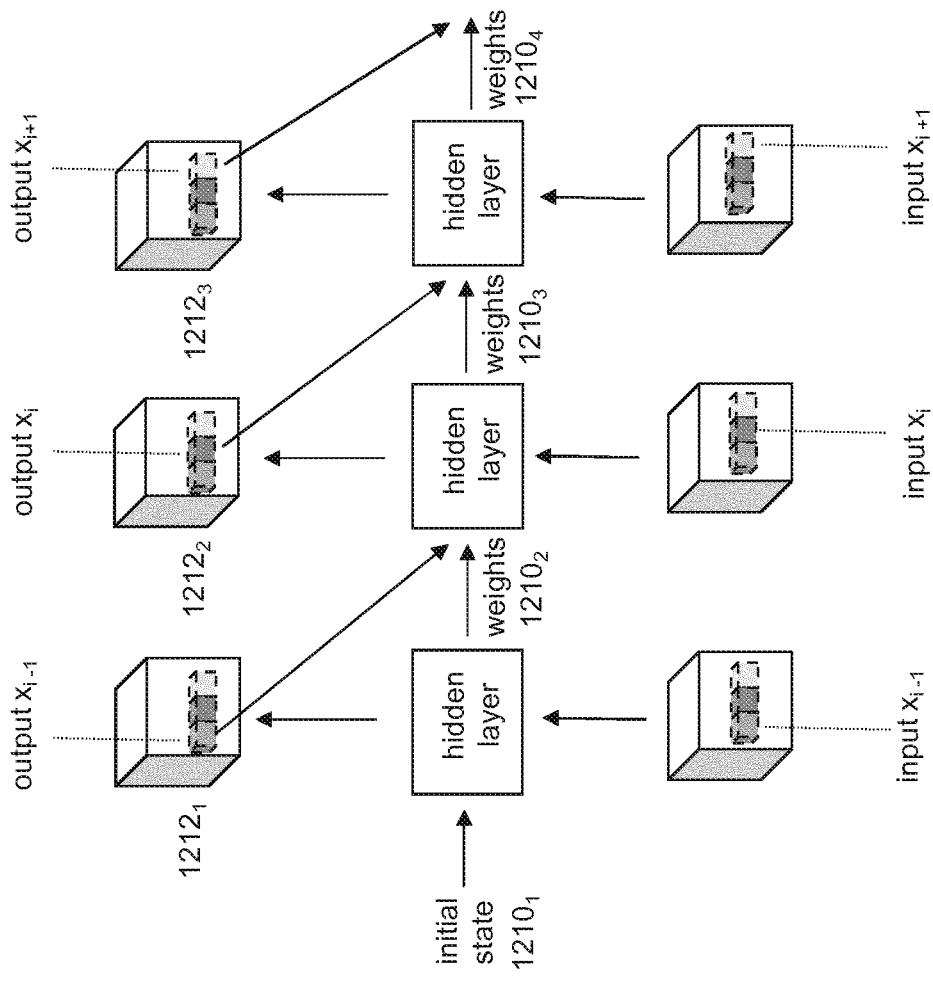
FIG. 12A-12B depict a schematic of a recurrent neural network according to an embodiment of the invention.
Figure 12A:
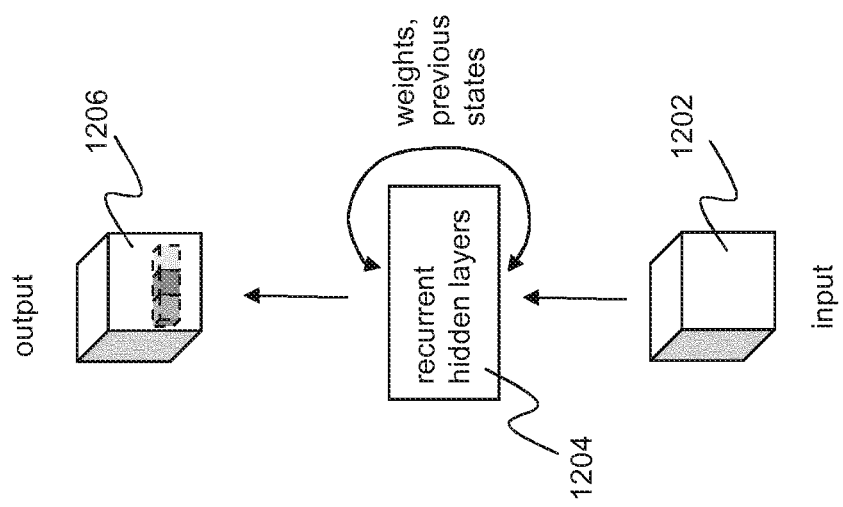

FIGS. 12A and 12B depict schematics of a 3D deep recurrent neural network according to an embodiment of the invention. Recurrent neural networks are a class of networks that is particular suited for predicting a pixel value on the basis of long-range dependencies between pixels in an image or between a sequence of images (of a video or a 3D data stack). The same holds for the 3D case wherein the long-range dependency between voxels in a voxel representation may be used to predict voxels.

FIG. 12A shows a deep recurrent neural network including a voxel input 1202, a 3D deep neural network, e.g. a 3D convolutional neural network, including one or more internal hidden states parameterized by weights and biases and an output 1206, wherein a layer is added which takes into account weights and biases and (part of) the output of one or more previous states. The number of previous states and its corresponding weights and biases are taken into account to computer the output of the subsequent state, can indicate the depth of the recurrent neural network with regards to the number of layers, e.g. the deep recurrent neural network illustrated in FIG. 12B is comprised of three layers. The deep recurrent neural network scheme is illustrated in more detail in FIG. 12B. As shown in 12B, an input $x_{i-1}$, e.g. a first block of input voxels surrounding a voxel which requires a voxel value prediction, e.g. the metal affected regions that requires correction, output $x_{i-1}$, is the input to the recurrent neural network, which determines an output $x_{i-1}$ (a first voxel value prediction, e.g. a value in Hounsfield Units) on the basis of weights and biases of the current state and the weights and biases of an initial state 1210$_1$. The next input $x_i$ (a second block of input voxels surrounding the next voxel which needs to be predicted) may be processed by the neural network on the basis of the weights and biases 1210$_2$ of the previous state and the first block of output voxels 1212$_1$ in order to generate a second block of output voxels including the second voxel which requires a voxel value prediction. Thereafter, the next input $x_{i+1}$ (a third block of input voxels) may be processed by the neural network on the basis of the weights and biases 1210$_3$ of the previous state and the second block of output voxels 1212$_2$ in order to generate a third block of output voxels, etc.

Figure 13:
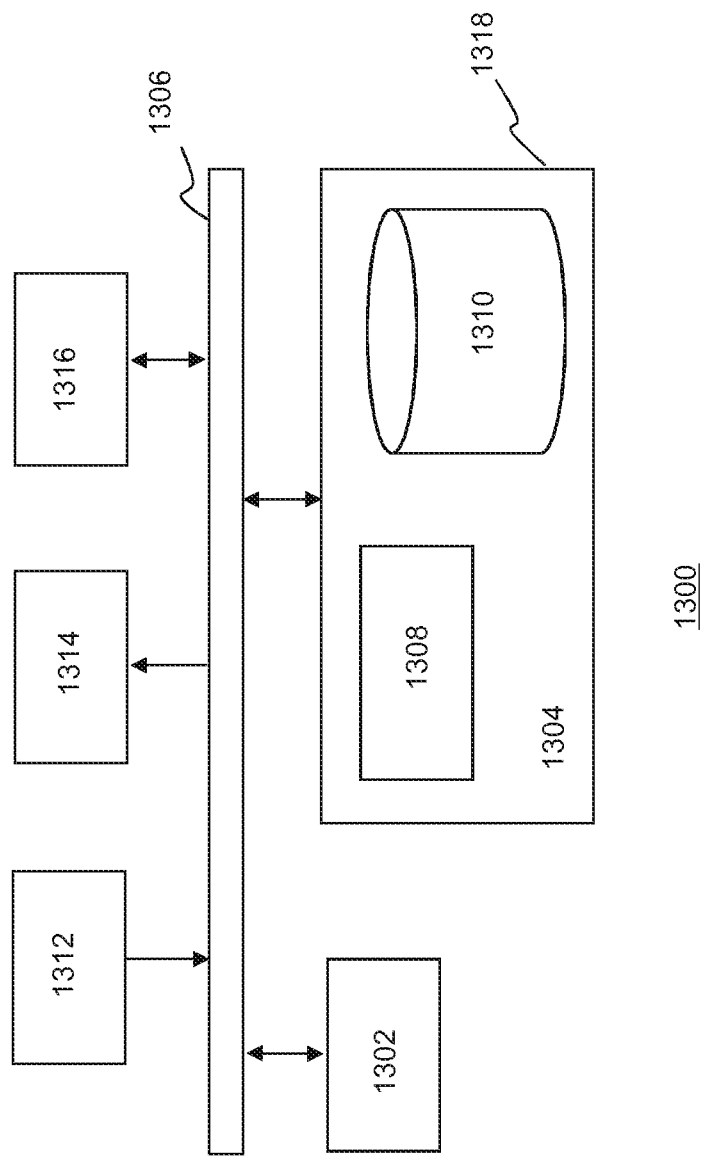
FIG. 13 depicts a block diagram illustrating an exemplary data processing system that may be used with embodiments described in this disclosure.

FIG. 13 is a block diagram illustrating an exemplary data processing system that may be used in embodiments as described in this disclosure. Data processing system 1300 may include at least one processor 1302 coupled to memory elements 1304 through a system bus 1306. As such, the data processing system may store program code within memory elements 1304. Further, processor 1302 may execute the program code accessed from memory elements 1304 via system bus 1306. In one aspect, data processing system may be implemented as a computer that is suitable for storing and/or executing program code. It should be appreciated, however, that data processing system 1300 may be implemented in the form of any system including a processor and memory that is capable of performing the functions described within this specification.

Memory elements 1304 may include one or more physical memory devices such as, for example, local memory 1308 and one or more bulk storage devices 1310. Local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from bulk storage device 1310 during execution.

Input/output (I/O) devices depicted as input device 1312 and output device 1314 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1316 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1300.

As pictured in FIG. 13, memory elements 1304 may store an application 1318. It should be appreciated that data processing system 1300 may further execute an operating system (not shown) that can facilitate execution of the application. Application, being implemented in the form of executable program code, can be executed by data processing system 1300, e.g., by processor 1302. Responsive to executing application, data processing system may be configured to perform one or more operations to be described herein in further detail.

In one aspect, for example, data processing system 1300 may represent a client data processing system. In that case, application 1318 may represent a client application that, when executed, configures data processing system 1300 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1318, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for correction of a voxel representation of metal affected x-ray data, the metal affected x-ray data representing artefacts in the x-ray data caused by metal or metallic objects in a volume of tissue that is imaged by an x-ray imager, the method comprising:
receiving, by a first three-dimensional (3D) deep neural network, an initial voxel representation of metal affected x-ray data at its input and generating a voxel map at its output, the voxel map identifying voxels of the initial voxel representation that belong to a region of voxels that are affected by metal, the first 3D deep neural network being trained on a basis of training data and reference data that include voxel representations of clinical x-ray data of a predetermined body part of a patient; and
receiving, by a second 3D deep neural network, the initial voxel representation and the voxel map generated by the first 3D deep neural network at its input and generating a corrected voxel representation, the corrected voxel representation including voxel estimations for voxels that are identified by the voxel map as being part of a metal affected region.

2. The method according to claim 1, wherein the first 3D deep neural network determining identification information includes:
generating, by the first 3D deep neural network, the voxel map, each voxel of the voxel map being associated with a voxel of the initial voxel representation of metal affected x-ray data and one or more probability measures, wherein a first probability measure of the one or more probability measures represents probability that the voxel is part of a metal region and a second probability measure represents probability that the voxel is part of a metal affected region.

3. The method according to claim 2, further comprising:
classifying, by the first 3D deep neural network, voxels in the initial voxel representation based on the first and second probability measures and based on one or more threshold values, into voxels that belong to a metal region and voxels that belong to a metal affected region.

4. The method according to claim 2 further comprising:
determining, by the first 3D deep neural network, for each voxel a metal class selected from a plurality of metal classes using the first probability measure and one or more metal threshold values.

5. The method of claim 4 wherein the plurality of metal classes includes a first metal class associated with non-metal materials and a second class of voxels associated with metals or metallic materials.

6. The method according to claim 1 wherein the first 3D deep neural network and/or the second 3D deep neural network comprises at least a first data processing path including at least a first set of 3D convolutional layers and at least a second data processing path parallel to the first data processing path, the second data processing path comprising a second set of 3D convolutional layers, the second set of 3D convolutional layers being configured to determine contextual information associated with blocks of voxels that are fed to the input of the first set of 3D convolutional layers.

7. The method of claim 6 wherein the first set of 3D convolutional layers is a first set of 3D CNN feature layers, and wherein the second set of 3D convolutional layers is a second set of 3D CNN feature layers.

8. The method according to claim 1, wherein the training data include voxel representations of clinical x-ray data of a body part of a patient before a metal-based treatment of the body part and voxel representations of clinical x-ray data of the body part of the patient after a metal-based treatment of the body part and wherein the reference data include voxel representations of clinical x-ray data of the body part of the patient before a metal-based treatment in which a metal region associated with the metal-based treatment of the body part is identified.

9. The method according to claim 1 wherein the second 3D deep neural network is trained to minimize artefacts associated with metal affected x-ray data in the initial voxel representation, wherein during training, the second 3D deep neural network is parameterized by first weights and biases selected to optimize a corrected voxel representation based on relationships following from one or more characteristics of the training data and one or more characteristics of the reference data.

10. The method according to claim 1 wherein the first and/or second 3D deep neural network includes and/or is part of a 3D convolutional neural network, a 3D generative adversarial neural network or a 3D recurrent deep neural network.

11. A computer-implemented method for training a three-dimensional (3D) deep neural network to correct a voxel representation of metal affected x-ray data, the metal affected x-ray data representing artefacts in the x-ray data caused by metal or metallic objects in a volume of tissue that is imaged by an x-ray imager, the method comprising:
receiving training data and reference data, wherein the training data include voxel representations of clinical x-ray data of a body part of a patient before a metal-based treatment and voxel representations of clinical x-ray data of the body part of the patient after a metal-based treatment and wherein the reference data include voxel representations of clinical x-ray data of the body part of the patient before the metal-based treatment in which a metal region associated with the metal-based treatment is identified;
receiving one or more voxel maps associated with the voxel representations of clinical x-ray data of the body part of the patient after a metal-based treatment, a voxel map identifying metal affected voxels in a voxel representation of clinical x-ray data of the body part of the patient after a metal-based treatment; and
training, the 3D deep neural network using the training data and the reference data to generate voxel predictions for voxels that are classified by the voxel map as voxels belonging to a metal affected region and to correct the metal affected voxels in a voxel representation of metal affected x-ray data based on the voxel predictions.

12. A computer-implemented method for training a neural network to process a voxel representation of metal affected x-ray data, the method comprising:
generating training data, the training data including one or more voxel representations of x-ray data of a body part of a patient before a metal-based treatment, one or more voxel representations of metal affected x-ray data after a metal-based treatment of the body part of the patient and one or more voxel maps, each of the one or more voxel maps identifying if voxels in a voxel representation of the metal affected x-ray data belong to a metal region and/or a metal affected region;
generating reference data, the reference data including voxel representations of x-ray data of the body part of the patient before the metal-based treatment;
training a generator neural network that is parameterized by first weights and biases following from one or more characteristics of the training data and one or more characteristics of the reference data, wherein the generator neural network is trained to receive an initial voxel representation of metal affected x-ray data at its input and to generate a corrected voxel representation at its output, the corrected voxel representation including voxel estimations for voxels of the initial voxel representation that are identified by a voxel map as being part of a metal affected region, wherein the training of the generator neural network includes modifying one or more of the first weights and biases to optimize the corrected voxel representation based on relationships following from the one or more characteristics of the training data and the one or more characteristics of the reference data;
training a discriminator neural network that is parameterized by second weights and biases following from one or more characteristics of the corrected voxel representations that include voxel estimations for voxels that are part of a metal affected region and one or more characteristics of the reference data, wherein the discriminator neural network is trained to discriminate between voxel representations of x-ray data representing a body part of a patient that comprises metal regions and corrected voxel representations generated by the generator neural network; and
utilizing information resulting from the discriminator neural network during the training of the generator neural network.

13. The method of claim 12 wherein the body part of the patient is a dento-maxillofacial structure of a patient.

14. The method of claim 12 wherein the generator neural network is a generator 3D deep neural network, and wherein the discriminator neural network is a discriminator 3D deep neural network.

15. A computer-implemented method of correction of a voxel representation of metal affected x-ray data comprising:
receiving an initial voxel representation representing metal affected x-ray data, the metal affected x-ray data representing artefacts in the x-ray data caused by metal or metallic objects in a volume of tissue that is imaged by an x-ray imager;
receiving a voxel map, the voxel map identifying voxels of the initial voxel representation that belong to a region of voxels that are affected by metal;
generating a corrected voxel representation based on the initial voxel representation and the voxel map using a generator three-dimensional (3D) deep neural network, the generator 3D deep neural network being trained on a basis of training data and reference data to minimize artefacts associated with metal affected x-ray data in the initial voxel representation, the training data and reference data including voxel representations of clinical x-ray data of a predetermined body part of a patient and one or more voxel maps, each of the one or more voxel maps identifying if voxels in a voxel representation of the metal affected x-ray data belong to a metal region and/or a metal affected region,
wherein during the training the generator 3D deep neural network is parameterized by first weights and biases selected to optimize the corrected voxel representation based on relationships following from one or more characteristics of the training data and one or more characteristics of the reference data and based on information resulting from a discriminator 3D deep neural network during the training of the generator 3D deep neural network, the discriminator 3D deep neural network being trained to discriminate between voxel representations of x-ray data representing a body part of a patient that comprises metal regions and corrected voxel representations generated by the generator 3D deep neural network.

16. The method according to claim 15, wherein the generator 3D deep neural network and/or the discriminator 3D deep neural network is configured as a 3D convolutional neural network and/or a 3D deep recurrent neural network.

17. The method of claim 15 wherein the body part of the patient is a dento-maxillofacial structure of a patient.

18. A computer system adapted to correct a voxel representation of metal affected x-ray data, the metal affected x-ray data representing artefacts in the x-ray data caused by metal or metallic objects in a volume of tissue that is imaged by an x-ray imager, the system comprising:
a computer readable storage medium having computer readable program code embodied therewith, the program code including a pre-processing algorithm and at least a trained first three-dimensional (3D) deep neural network, the computer readable program code; and a processor coupled to the computer readable storage medium, wherein responsive to executing the computer readable program code, the processor is configured to perform executable operations comprising:
providing an initial voxel representation of metal affected x-ray data to a input of a first 3D deep neural network, the first 3D deep neural network being trained to generate a voxel map at its output, the voxel map identifying voxels of the initial voxel representation that belong to a region of voxels that are affected by metal, the first 3D deep neural network being trained on a basis of training data and reference data that include voxel representations of clinical x-ray data of a predetermined body part of a patient; and
providing the initial voxel representation and the voxel map generated by the first 3D deep neural network to a input of a second 3D deep neural network, the second 3D deep neural network being trained to generate a corrected voxel representation, the corrected voxel representation including voxel estimations for voxels that are identified by the voxel map as being part of a metal affected region.

* * * * *